(12) United States Patent
Kawahara

(10) Patent No.: US 10,647,186 B2
(45) Date of Patent: May 12, 2020

(54) METHOD FOR REDUCING OPENING/CLOSING TIME OF OPENING/CLOSING-TYPE ROOF

(71) Applicant: WEBASTO JAPAN CO., LTD., Higashihiroshima-shi, Hiroshima (JP)

(72) Inventor: Kenji Kawahara, Higashihiroshima (JP)

(73) Assignee: WEBASTO JAPAN CO., LTD., Hiroshima (JP)

( * ) Notice: Subject to any disclaimer, the term of this patent is extended or adjusted under 35 U.S.C. 154(b) by 0 days.

(21) Appl. No.: 16/084,842

(22) PCT Filed: Feb. 27, 2017

(86) PCT No.: PCT/JP2017/007511
§ 371 (c)(1),
(2) Date: Sep. 13, 2018

(87) PCT Pub. No.: WO2017/159322
PCT Pub. Date: Sep. 21, 2017

(65) Prior Publication Data
US 2019/0070942 A1    Mar. 7, 2019

(30) Foreign Application Priority Data

Mar. 18, 2016  (JP) .................................. 2016-055217

(51) Int. Cl.
*B60J 7/14* (2006.01)
*B60J 7/20* (2006.01)
(Continued)

(52) U.S. Cl.
CPC ............... *B60J 7/1204* (2013.01); *B60J 7/12* (2013.01); *B60J 7/143* (2013.01); *B60J 7/20* (2013.01);
(Continued)

(58) Field of Classification Search
CPC ............. B60J 7/20; B60J 7/1204; B60J 7/143
(Continued)

(56) References Cited

U.S. PATENT DOCUMENTS

| | | |
|---|---|---|
| 5,758,923 A | 6/1998 | Kolb |
| 2007/0222254 A1* | 9/2007 | Wagner .................. B60J 7/0573 296/108 |
| 2010/0223851 A1 | 9/2010 | Odoi et al. |

FOREIGN PATENT DOCUMENTS

| | | |
|---|---|---|
| JP | H5-270270 A | 10/1993 |
| JP | H9-104234 A | 4/1997 |

(Continued)

*Primary Examiner* — Dennis H Pedder
(74) *Attorney, Agent, or Firm* — Maschoff Brennan

(57) ABSTRACT

A second step of opening a closed openable/closable roof starts before a first step of opening a closed storage compartment cover finishes, so that a distance between portions of the storage compartment cover and the openable/closable roof facing each other is shorter at a point in time when the storage compartment cover is fully opened in the first step than at any other point in time. A fifth step of closing the open openable/closable roof starts before a fourth step of opening the closed storage compartment cover finishes, so that a distance between portions of the storage compartment cover and the openable/closable roof facing each other is shorter at a point in time when the storage compartment cover is fully opened in the fourth step than at any other point in time.

9 Claims, 17 Drawing Sheets

(51) Int. Cl.
*B60J 7/12* (2006.01)
*E05F 15/70* (2015.01)
(52) U.S. Cl.
CPC ........... *E05F 15/70* (2015.01); *E05Y 2400/10* (2013.01); *E05Y 2900/531* (2013.01)
(58) Field of Classification Search
USPC .......................................... 296/107.08, 108
See application file for complete search history.

(56) References Cited

FOREIGN PATENT DOCUMENTS

| | | |
|---|---|---|
| JP | 2007-182173 A | 7/2007 |
| JP | 2007-263219 A | 10/2007 |
| JP | 2013-006600 A | 1/2013 |

\* cited by examiner

METHOD FOR REDUCING OPENING/CLOSING TIME OF OPENING/CLOSING-TYPE ROOF

TECHNICAL FIELD

The present invention relates to a method for reducing the time taken to open and close an openable/closable roof of a vehicle.

BACKGROUND ART

An operation of an openable/closable roof of a known vehicle (a passenger car), such as an electric retractable roof having a storage compartment covered with an electric storage compartment cover will be described.

As shown in FIG. 20, in an opening operation performed so that a known retractable roof shifts from a closed position to an open position, the storage compartment cover is first fully opened. Subsequently, the roof is fully opened, and then the storage compartment cover is closed. Although not shown, also in a closing operation performed so that the known retractable roof shifts from the open position to the closed position, the storage compartment cover is first fully opened. Subsequently, the roof is fully closed, and then the storage compartment cover is closed.

As described above, the known electric openable/closable roof is designed and controlled so that after each of the opening and closing operations of the roof and the storage compartment cover has finished, the operation proceeds to the next step.

CITATION LIST

Patent Document

[Patent Document 1] Japanese Unexamined Patent Publication No. 2007-182173

[Patent Document 2] Japanese Unexamined Patent Publication No. 2013-006600

SUMMARY OF THE INVENTION

Technical Problem

However, in the known technique, after each of the opening operation and the closing operation has finished, the operation proceeds to the next step, resulting in an increase in the time taken to perform a series of operations.

One reason for this is that, in general, since the speed at which the roof operates and the speed at which the storage compartment cover operates are different from each other, the roof and the storage compartment cover must be controlled to operate only in a region where they are not in contact with each other at all (i.e., a region where they do not interfere with each other).

In view of the foregoing background, it is therefore an object of the present invention to reduce the time it takes for an openable/closable roof to perform a series of opening and closing operations.

Solution to the Problem

To solve the foregoing problem, the present invention is characterized in that an openable/closable roof and a storage compartment cover are operated in parallel so as to be brought closer to each other to the extent that the roof and the storage compartment cover do not interfere with each other.

Specifically, the present invention is directed to a method for reducing the time taken to open and close an openable/closable roof, and provides the following solution.

That is to say, a first aspect of the invention is directed to a method for reducing a time taken to open and close an electric openable/closable roof of a vehicle. The vehicle includes the electric openable/closable roof, a storage compartment in which the openable/closable roof is retracted, and an electric storage compartment cover covering the storage compartment. The method includes: when the openable/closable roof shifts from a closed state to an open state, a first step of opening the closed storage compartment cover; a second step of opening the closed openable/closable roof; and a third step of closing the open storage compartment cover; and when the openable/closable roof shifts from the open state to the closed state, a fourth step of opening the closed storage compartment cover; a fifth step of closing the open openable/closable roof; and a sixth step of closing the open storage compartment cover. The second step starts before the first step finishes, so that a distance between portions of the storage compartment cover and the openable/closable roof facing each other is shorter at a point in time when the storage compartment cover is fully opened in the first step than at any other point in time, and the fifth step starts before the fourth step finishes, so that a distance between the portions of the storage compartment cover and the openable/closable roof facing each other is shorter at a point in time when the storage compartment cover is fully opened in the fourth step than at any other point in time.

According to this configuration, the second step of opening the closed openable/closable roof starts before the first step finishes, so that the distance between the portions of the storage compartment cover and the openable/closable roof facing each other is shorter at a point in time when the storage compartment cover is fully opened in the first step than at any other point in time. The fifth step of closing the open openable/closable roof starts before the fourth step finishes, so that the distance between the storage compartment cover and the openable/closable roof facing each other is shorter at a point in time when the storage compartment cover is fully opened in the fourth step than at any other point in time. Thus, if the openable/closable roof shifts from the closed state to the open state, or if the openable/closable roof shifts from the open state to the closed state, a step in which the storage compartment cover operates is partially performed in parallel with a step in which the openable/closable roof operates. This can reduce the time taken to open and close the openable/closable roof.

A second aspect of the invention is an embodiment of the first aspect of the invention. In the second aspect, the third step may start before the second step finishes, so that a distance between the portions of the storage compartment cover and the openable/closable roof facing each other is shortest while the storage compartment cover is in a fully open state in the third step, and the sixth step may start before the fifth step finishes, so that a distance between the portions of the storage compartment cover and the openable/closable roof facing each other is shortest while the storage compartment cover is in a fully open state in the sixth step.

According to this configuration, the third step of closing the open storage compartment cover starts before the second step finishes, so that the distance between the portions of the storage compartment cover and the openable/closable roof facing each other is shortest while the storage compartment cover is in the fully open state in the third step. The sixth step of closing the open storage compartment cover also starts before the fifth step finishes, so that the distance between the portions of the storage compartment cover and the openable/closable roof facing each other is shortest while the storage compartment cover is in the fully open state in the sixth step. Thus, if the openable/closable roof shifts from the closed state to the open state, or if the openable/closable roof shifts from the open state to the closed state, a step in which the storage compartment cover operates is partially performed in parallel with a step in which the openable/closable roof operates. This can reduce the time taken to open and close the openable/closable roof.

A third aspect of the invention is an embodiment of the first aspect of the invention. In the third aspect, adjusting a moving speed of the storage compartment cover and a moving speed of the openable/closable roof may allow a distance between the storage compartment cover and the openable/closable roof at a point in time when the storage compartment cover is fully opened in the first and fourth steps to be shorter than at any other point in time.

According to this configuration, adjusting the moving speeds of the storage compartment cover and the openable/closable roof allows the distance between the cover and the openable/closable roof to be shorter at a point in time when the cover is fully opened than at any other point in time. Thus, once the moving speeds of the cover and the roof are set as defaults, the cover and the roof can be operated in parallel (at the same time) without interfering with each other.

In addition, determining the moving speed of the roof for each of positions of the roof can vary the speed.

A fourth aspect of the invention is an embodiment of the second aspect of the invention. In the fourth aspect, adjusting a moving speed of the storage compartment cover and a moving speed of the openable/closable roof may allow a distance between the storage compartment cover and the openable/closable roof to be shortest while the storage compartment cover is in a fully open state in the third and sixth steps.

According to this configuration, adjusting the moving speeds of the storage compartment cover and the openable/closable roof allows the distance between the cover and the openable/closable roof to be shortest. Thus, once the moving speeds of the cover and the roof are set as defaults, the cover and the roof can be operated in parallel (at the same time) without interfering with each other.

In addition, determining the moving speed of the roof for each of positions of the roof can vary the speed.

A fifth aspect of the invention is an embodiment of the first aspect of the invention. In the fifth aspect, the second and fifth steps may each start when the storage compartment cover reaches a region where the openable/closable roof and the storage compartment cover do not interfere with each other.

According to this configuration, the second step of opening the roof and the fifth step of closing the roof each start when the storage compartment cover reaches the region where the openable/closable roof and the storage compartment cover do not interfere with each other. This can prevent interference between the openable/closable roof and the storage compartment cover with reliability.

A sixth aspect of the invention is an embodiment of the second aspect of the invention. In the sixth aspect, the third and sixth steps may each start when the openable/closable roof reaches a region where the openable/closable roof and the storage compartment cover do not interfere with each other.

According to this configuration, the third step of closing the storage compartment cover and the sixth step of opening the storage compartment cover each start when the openable/closable roof reaches the region where the openable/closable roof and the storage compartment cover do not interfere with each other. This can prevent interference between the openable/closable roof and the storage compartment cover with reliability.

A seventh aspect of the invention is an embodiment of the first aspect of the invention. In the seventh aspect, the second and fifth steps may each start when the storage compartment cover reaches a non-interference region where movement paths of the openable/closable roof and the storage compartment cover do not interfere with each other.

According to this configuration, the second step of opening the roof and the fifth step of closing the roof each start when the storage compartment cover reaches the non-interference region where the movement paths of the openable/closable roof and the storage compartment cover do not interfere with each other. This can prevent interference between the openable/closable roof and the storage compartment cover with reliability.

An eighth aspect of the invention is an embodiment of the second aspect of the invention. In the eighth aspect, the third and sixth steps may each start when the openable/closable roof reaches a non-interference region where movement paths of the openable/closable roof and the storage compartment cover do not interfere with each other.

According to this configuration, the third step of closing the storage compartment cover and the sixth step of opening the storage compartment cover each start when the openable/closable roof reaches the non-interference region where the movement paths of the openable/closable roof and the storage compartment cover do not interfere with each other. This can prevent interference between the openable/closable roof and the storage compartment cover with reliability.

A ninth aspect of the invention is an embodiment of any one of the first through eighth aspects of the invention. In the ninth aspect, in each of the first, second, third, fourth, fifth, and sixth steps, moving speeds of the openable/closable roof and the storage compartment cover may be reduced both immediately after the openable/closable roof and the storage compartment cover start operating and immediately before the openable/closable roof and the storage compartment cover finish operating or only immediately before the openable/closable roof and the storage compartment cover finish operating.

According to this configuration, in each of the steps of opening and closing the openable/closable roof and the steps of opening and closing the storage compartment cover, the moving speeds of the roof and the cover are reduced both immediately after the roof and the cover start operating and immediately before the roof and the cover finish operating or only immediately before the roof and the cover finish operating. This allows passengers to feel secure during the opening and closing operations of the roof and the cover, in particular, during the closing operation.

Advantages of the Invention

According to the present invention, if the openable/closable roof opens and closes, a step in which the storage compartment cover operates is partially performed in parallel with a step in which the openable/closable roof operates. This can reduce the time taken to open and close the openable/closable roof.

DESCRIPTION OF EMBODIMENTS

One Embodiment

Figure 1:
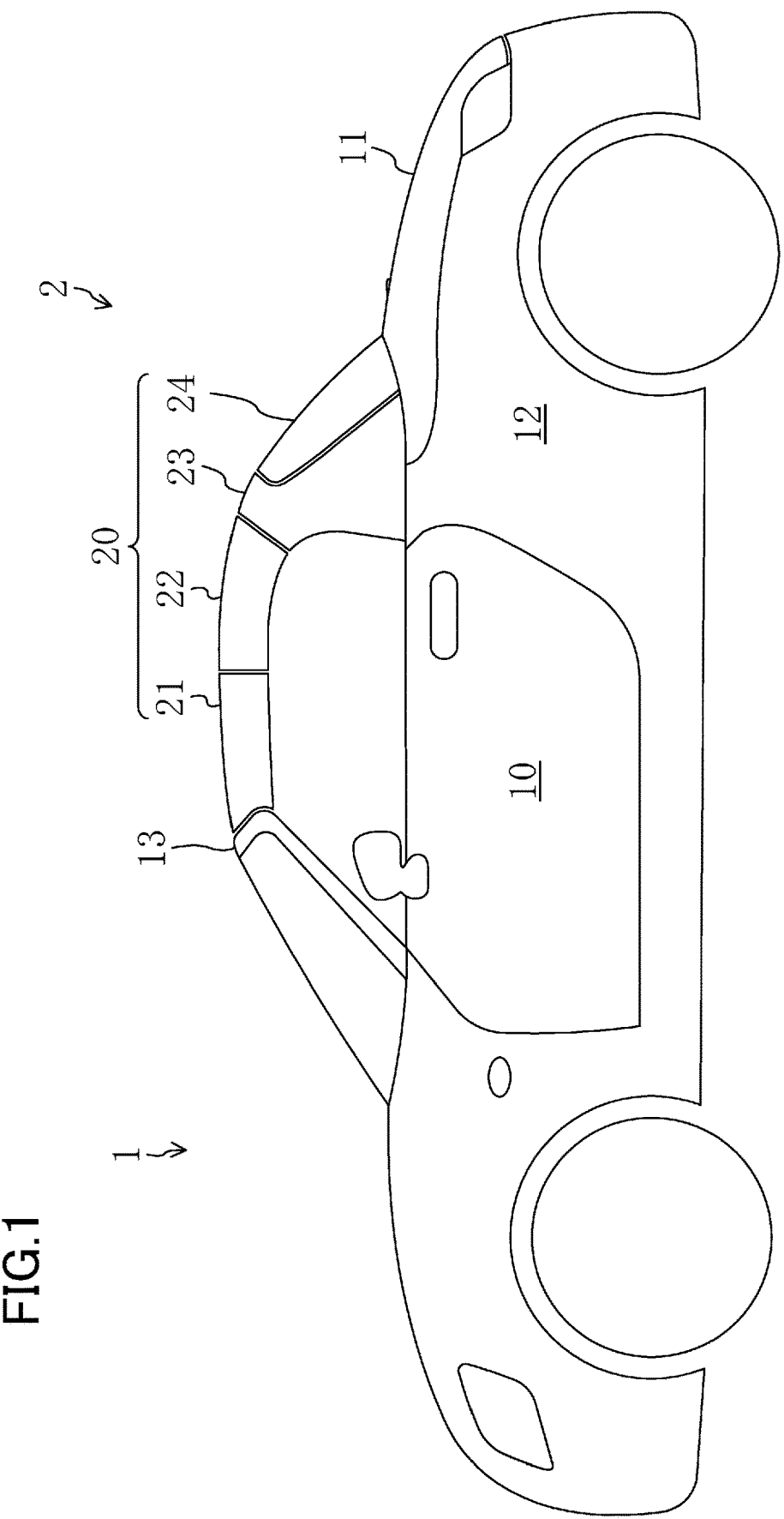
FIG. 1 is a side view showing a vehicle including an openable/closable roof according to an embodiment of the present invention.

An embodiment of the present invention will now be described with reference to the drawings.

As shown in FIGS. 1 to 4, a vehicle 1 according to this embodiment is, for example, a passenger car, which includes a retractable roof 20 that is an openable/closable roof, and an opening/closing mechanism 2 for the retractable roof 20. The retractable roof 20 includes, for example, a front roof panel 21 and a middle roof panel 22 both covering an upper portion of a passenger compartment 10, and a rear roof panel 23 and a rear window 24 both covering a rear portion of the passenger compartment 10. The opening/closing mechanism 2 for these roof panels includes, for example, the retractable roof 20, a front linkage linking the front and middle roof panels 21 and 22 to the vehicle 1, a rear linkage linking the rear roof panel 23 and the rear window 24 to the vehicle 1, and a drive motor driving the front and rear linkages together.

The front roof panel 21 is arranged to cover an upper portion of a front portion of the passenger compartment 10. The middle roof panel 22 is disposed adjacent to the rear end of the front roof panel 21 to cover an upper portion of a rear portion of the passenger compartment 10.

The rear roof panel 23 is arranged to cover a space between the middle roof panel 22 and a trunk lid 11 that is a storage compartment cover forming a rear portion of the vehicle 1 and described below. The rear roof panel 23 has an opening at its center. The opening is closed with the rear window 24. The rear window 24 has its upper end mounted through hinges to the rear roof panel 23 at both end portions thereof in the vehicle width direction. That is to say, the rear window 24 is configured to be turnable inwardly of the rear roof panel 23 (toward the passenger compartment 10 shown in FIG. 1) around the hinges.

The vehicle 1 has, for example, a trunk space behind the passenger compartment 10, and a storage compartment 12 which is formed between the passenger compartment 10 and the trunk space and into which the retractable roof 20 is retracted. The storage compartment 12 has an open upper end. The trunk space and the storage compartment 12 each have its upper opening closed. The upper opening is openable and closable with the trunk lid 11.

In this embodiment, the retractable roof 20 is comprised of four members, i.e., the front roof panel 21, the middle roof panel 22, the rear roof panel 23, and the rear window 24. However, this is merely an example of the present invention. For example, the front roof panel 21 and the middle roof panel 22 may be integrated together without being separate from each other. Alternatively, the rear roof panel 23 and the trunk lid 11 may be integrated together without retracting the rear roof panel 23 into the storage compartment 12. In this case, it does not matter whether or not the rear window 24 is retracted into the storage compartment 12. As can be seen, various configurations of components of the retractable roof 20, such as a roof, are conceivable in accordance with the vehicle 1 including the retractable roof 20.

Here, an operation for changing the position of the retractable roof 20 (i.e., an operation for changing the position of the retractable roof 20 from a fully closed position where the retractable roof 20 covers the passenger compartment 10 to a retracted position where the passenger compartment 10 is open and where the retractable roof 20 is retracted into the storage compartment 12) will be described with reference to FIGS. 1 to 4. The state where the retractable roof 20 is in the fully closed position is referred to as a "fully closed state." The retracted position corresponds to a fully open position. The state where the retractable roof 20 is in the fully open position is referred to as a "retracted state." Note that the operation for changing the position of the retractable roof 20 from the fully closed position to the retracted position is hereinafter referred to as an "opening operation," and the operation for changing the position of the retractable roof 20 from the retracted position to the fully closed position is hereinafter referred to as a "closing operation."

In the fully closed position shown in FIG. 1, a front end portion of the front roof panel 21 is retained on a front header 13 of the vehicle 1 by a lock mechanism (a roof lock or a top lock, not shown) while being in contact with the front header 13. A rear end portion of the front roof panel 21 and a front end portion of the middle roof panel 22 are in contact with each other with a weatherstrip (not shown) interposed therebetween. Likewise, a rear end portion of the middle roof panel 22 and a front end portion of the rear roof panel 23 are in contact with each other with another weatherstrip interposed therebetween. So are a lower end portion of the rear roof panel 23 and a front end portion of the trunk lid 11, and so are the periphery of the opening of the rear roof panel 23 and the periphery of the rear window 24. As can be seen, the front roof panel 21, the middle roof panel 22, the rear roof panel 23, and the rear window 24 surround the passenger compartment 10.

Figure 2:
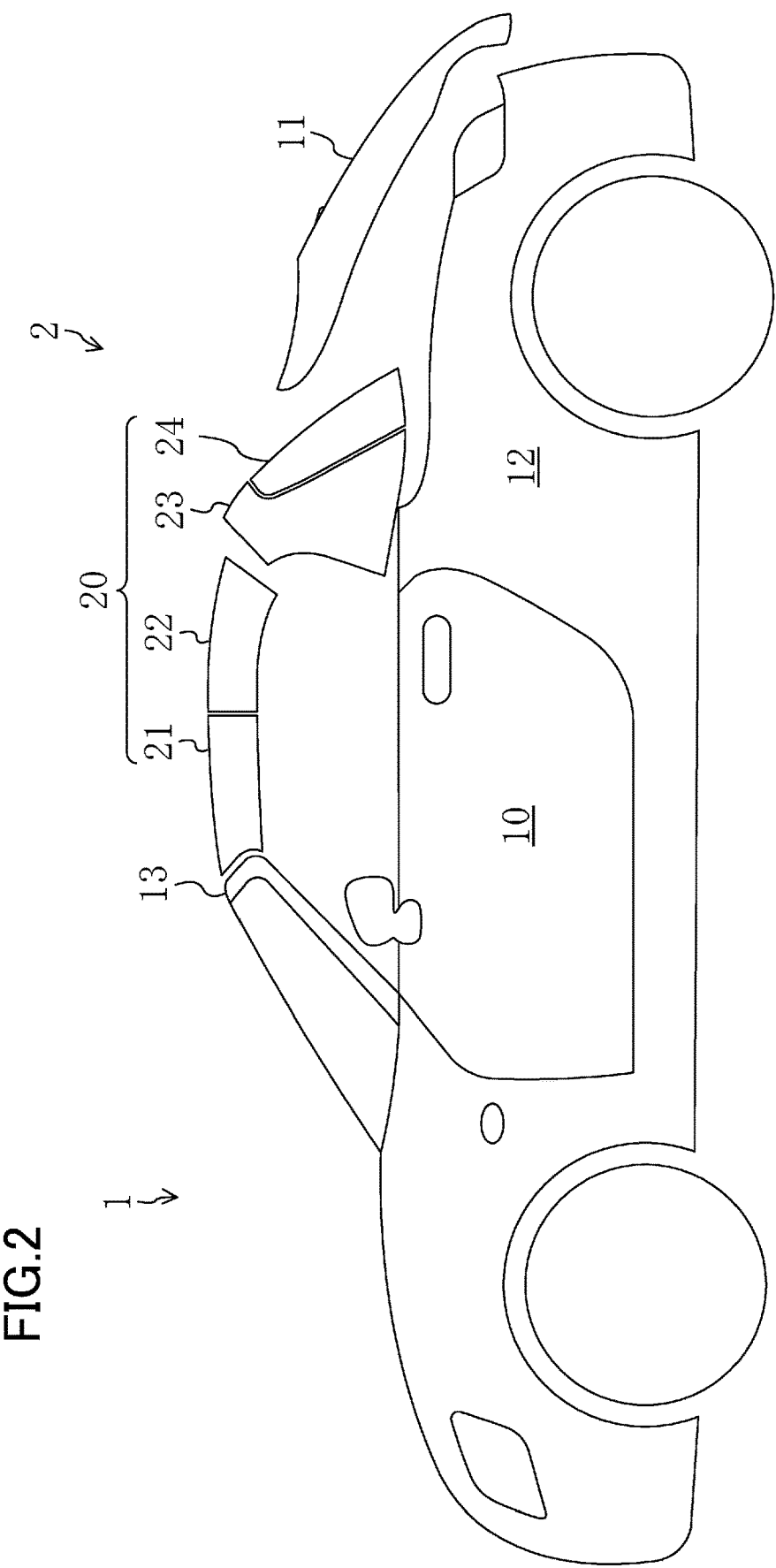
FIG. 2 is a side view showing the vehicle shown in FIG. 1 immediately after an opening operation of the openable/closable roof of the vehicle starts.

First, the trunk lid 11 moves from the fully closed position shown in FIG. 1 to the fully open position shown in FIG. 2 through a driving source and linkages (both not shown) to open the upper opening of the storage compartment 12.

Next, actuating the drive motor allows a combination of the front roof panel 21 and the middle roof panel 22 and a combination of the rear roof panel 23 and the rear window 24 to start turning backward (turning in the clockwise direction shown in FIG. 1).

Figure 3:
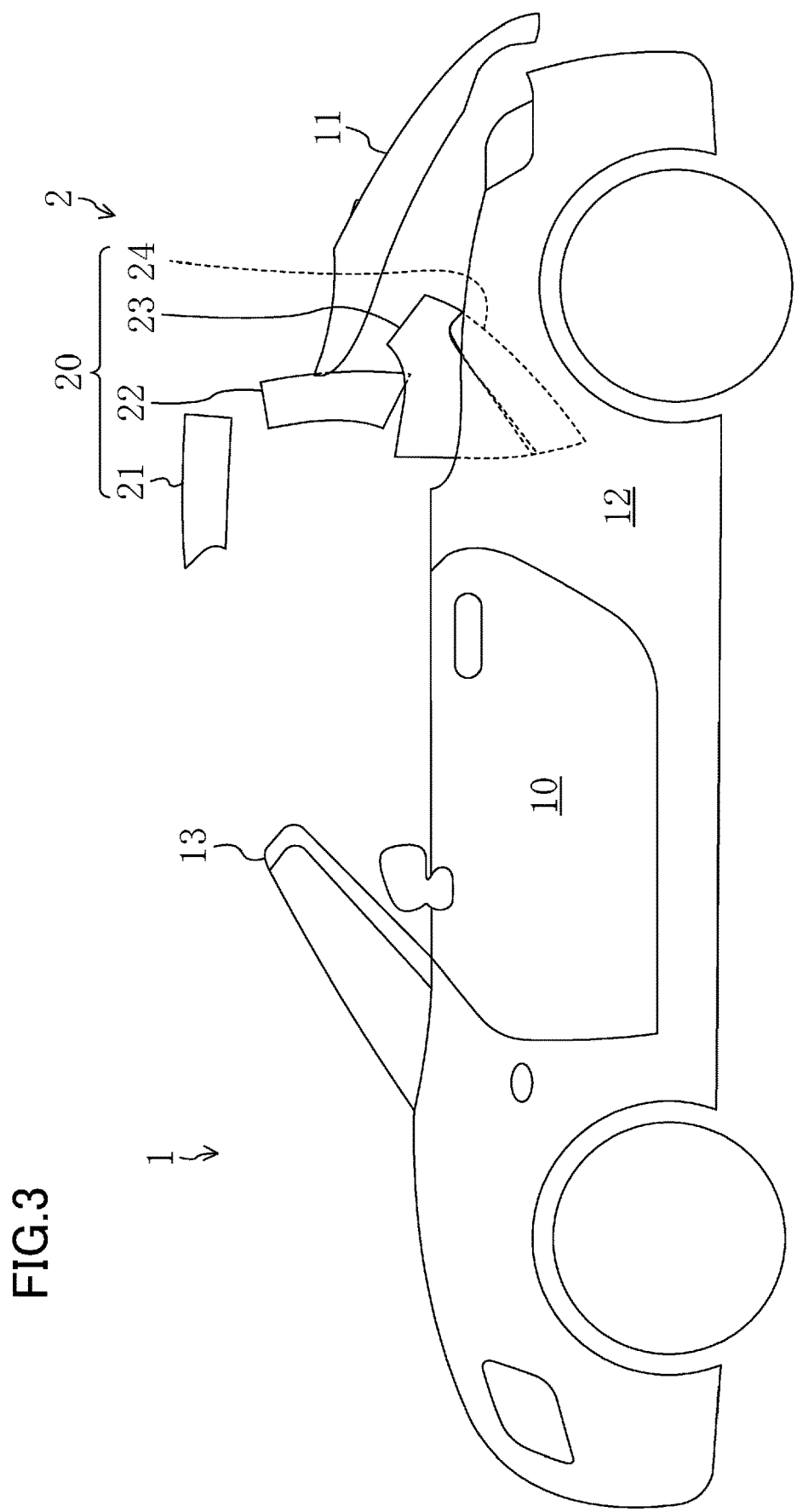
FIG. 3 is a side view showing the vehicle immediately before the opening operation of the openable/closable roof finishes.

Keeping operating the drive motor allows the combination of the front roof panel 21 and the middle roof panel 22 to turn backward and to be folded so that surfaces of these panels near the passenger compartment 10 face inward, as shown in FIG. 3. On the other hand, the rear roof panel 23 and the rear window 24 turn so that their surfaces near the passenger compartment face substantially upward. In this state, the rear window 24 descends inward of the rear roof panel 23 (toward the passenger compartment 10 in the fully closed position shown in FIG. 1).

Figure 4:
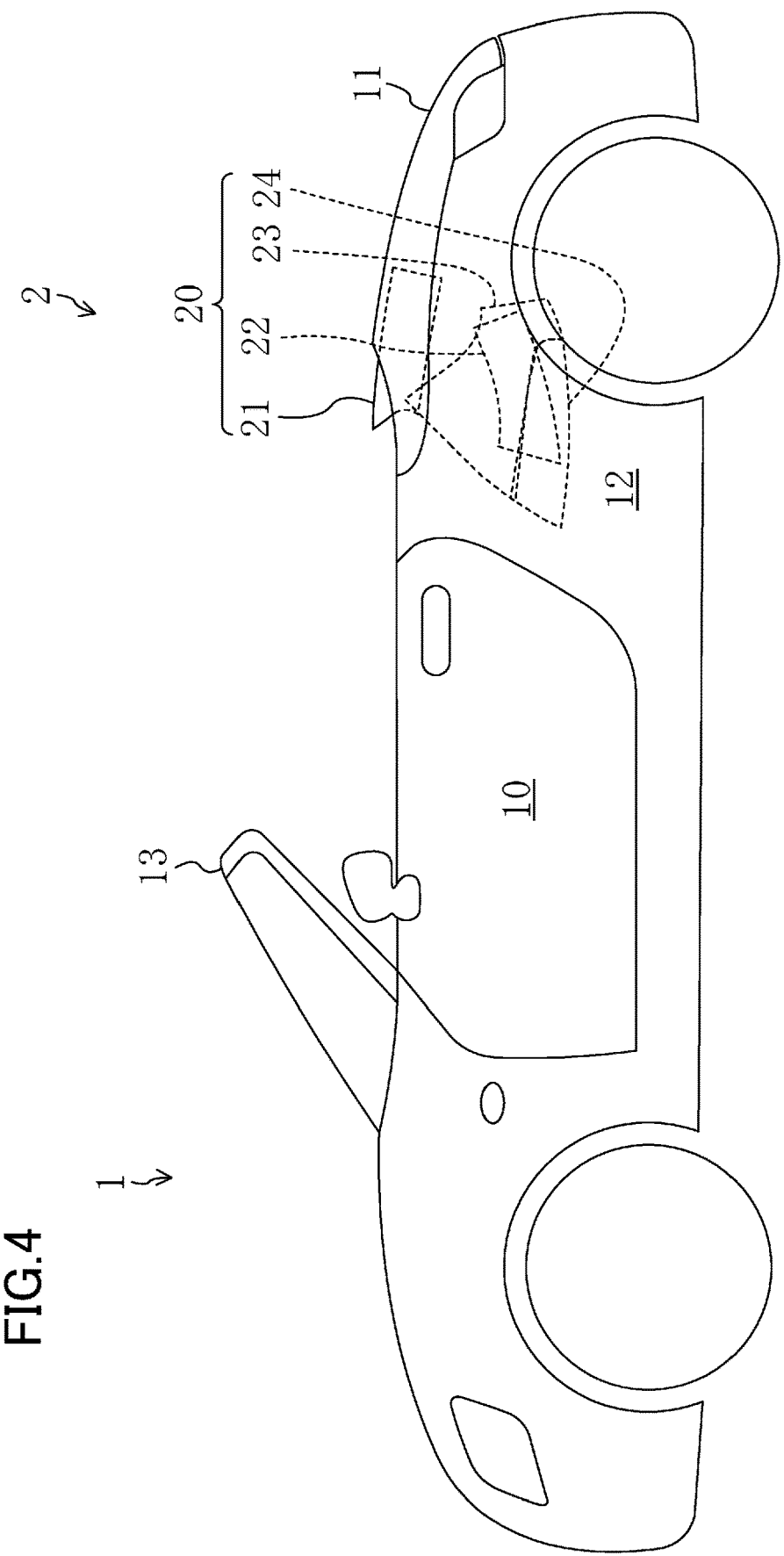
FIG. 4 is a side view showing the vehicle having the openable/closable roof retracted.

Further keeping operating the drive motor allows the retractable roof 20 to be retracted in the storage compartment 12 as shown in FIG. 4. In this state, the rear roof panel 23 and the rear window 24 are retracted so that their surfaces near the passenger compartment face completely upward. The rear window 24 has descended inward of the rear roof panel 23. This reduces the thickness of the combination of the rear roof panel 23 and the rear window 24 retracted (the vertical size of the combination in the storage compartment 12). The front and middle roof panels 21 and 22 fit into a space inside the rear roof panel 23 and the rear window 24 while being folded, and vertically overlapping each other, so that their surfaces near the passenger compartment 10 face each other.

After the retractable roof 20 is retracted into the storage compartment 12, the trunk lid 11 moves from the fully open position to the fully closed position where the storage compartment 12 is closed. This allows the retractable roof 20 to be retracted to open the passenger compartment 10. Note that the closing operation of the retractable roof 20 is the reverse of the foregoing operation.

The retractable roof 20 operating as described above is coupled to the body of the vehicle 1 through the front linkage and the rear linkage. The front and rear linkages are disposed on a surface of the retractable roof 20 near the passenger compartment 10 and at both ends of the retractable roof 20 in the vehicle width direction.

The present invention is characterized in that, to reduce the time it takes for the retractable roof 20 to perform the opening and closing operations, the opening and closing operations are performed as indicated below so that operations are partially performed in parallel.

First, FIGS. 5 to 8 are timing charts showing how the opening and closing operations of the openable/closable roof (hereinafter referred to simply as the "roof") according to this embodiment are controlled. In the timing charts shown in FIG. 5 and the subsequent drawings, the term "trunk lid" is replaced with the term "storage compartment cover" in consideration of a vehicle including a member covering the storage compartment independently.

<Full Opening Operation of Roof>

Figure 5:
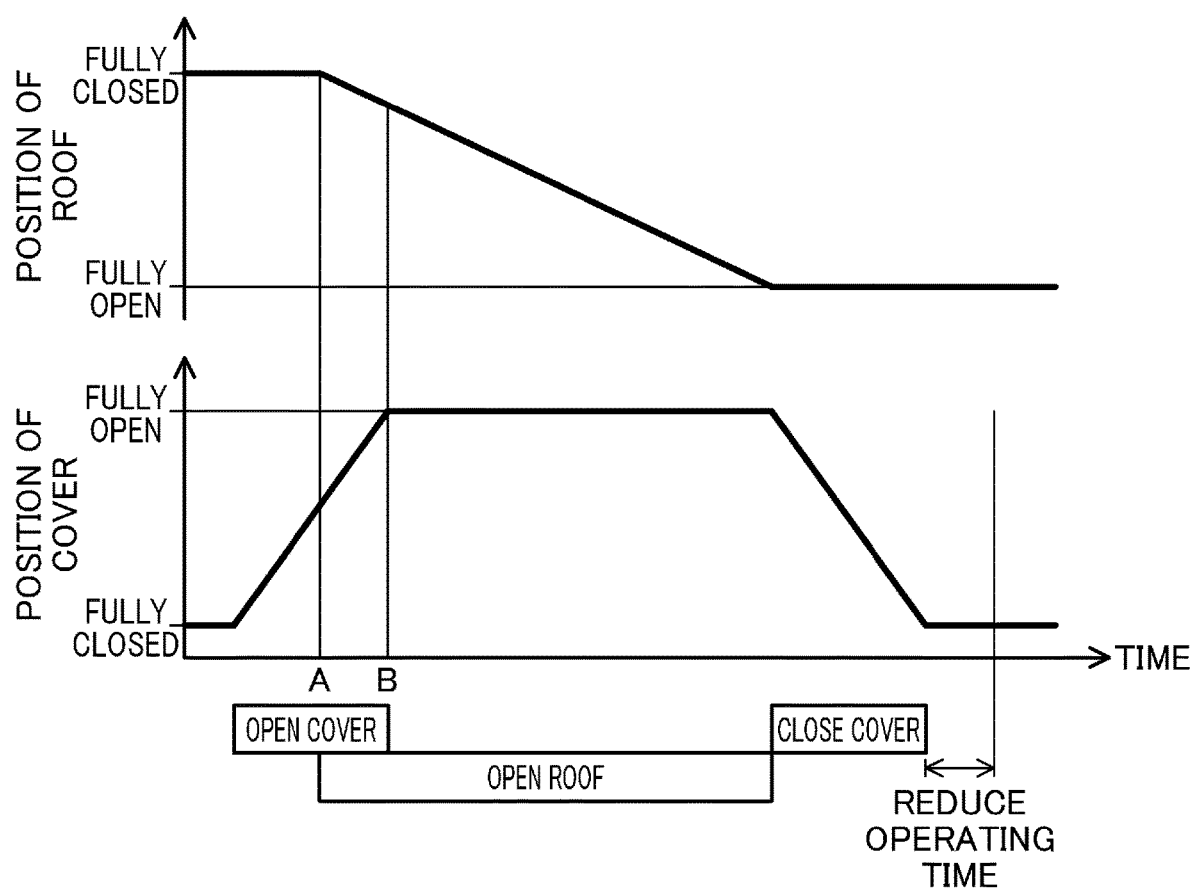
FIG. 5 is a timing chart showing how a portion of a full opening operation of the openable/closable roof according to the embodiment of the present invention after actuation of the roof and a portion of an opening operation of a storage compartment cover are performed in parallel.

How control is performed while the roof shifts from the fully closed position to the retracted position will be described with reference to FIG. 5. As shown in FIG. 5, after an opening operation of the storage compartment cover is initially started (a lower portion of FIG. 5), an opening operation of the roof is started at a point A before the storage compartment cover reaches the fully open position (a point B) (an upper portion of FIG. 5). The point B represents a point in time at which the storage compartment cover is fully opened and at which the distance between the roof performing the opening operation and the storage compartment cover is minimum to the extent that the roof does not interfere with the storage compartment cover. The minimum distance specifically means the distance by which adjacent portions of the roof and the storage compartment cover facing each other are distant from each other at the point in time when the storage compartment cover is fully opened, and which is shorter than at any other point in time. However, the adjacent portions of the roof and the storage compartment cover facing each other themselves change with time. Thus, at the point in time when the storage compartment cover is fully opened, the distance between the portions of the roof and the storage compartment cover facing each other is shorter than at any other point in time. Thus, the roof and the storage compartment cover do not interfere with each other even during the other operations, because the roof and the storage compartment cover do not interfere with each other when the storage compartment cover is fully opened.

As can be seen from the foregoing description, in this embodiment, the opening operation of the roof is started during the full opening operation of the storage compartment cover as shown in FIG. 5. This can reduce the time taken to open the entire system by the amount of time during which the storage compartment cover and the roof operate in parallel.

<Full Closing Operation of Roof>

Figure 6:
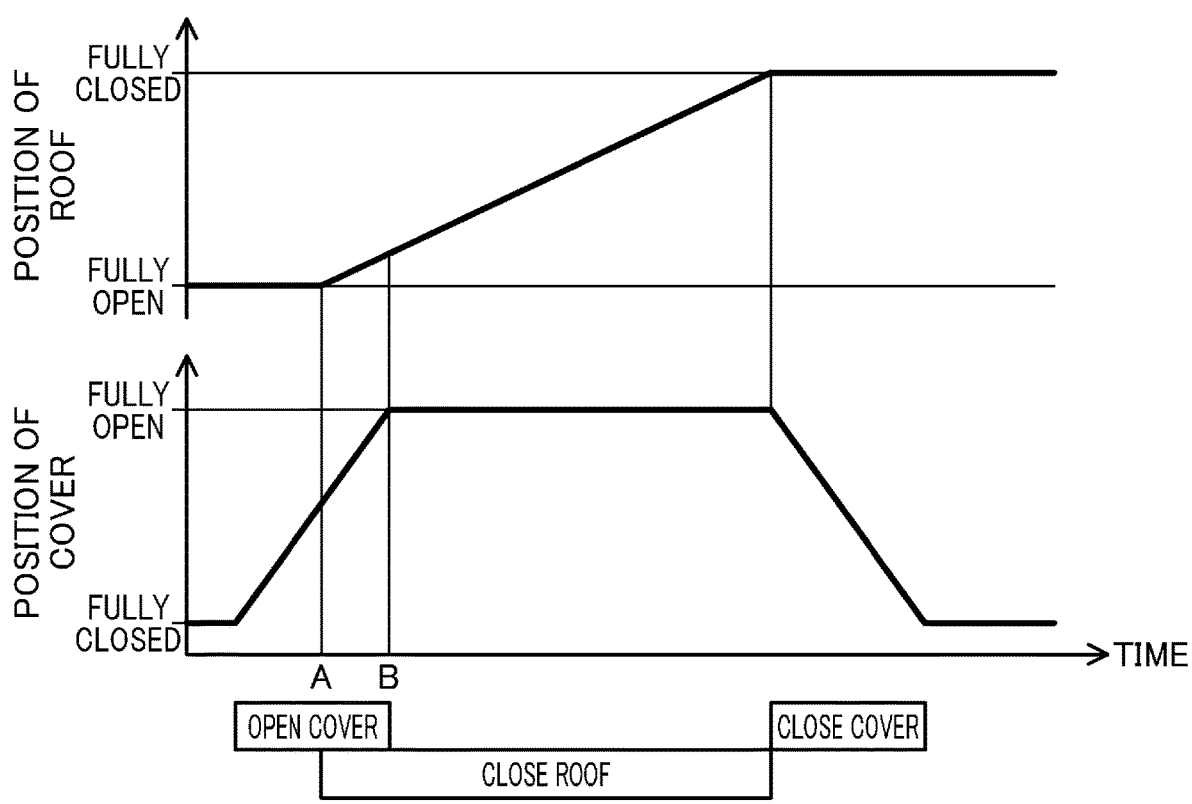
FIG. 6 is a timing chart showing how a portion of a full closing operation of the openable/closable roof according to the embodiment of the present invention after actuation of the roof and a portion of an opening operation of a storage compartment cover are performed in parallel.

Next, how control is performed while the roof shifts from the retracted position to the fully closed position will be described with reference to FIG. 6. As shown in FIG. 6, after the opening operation of the storage compartment cover is initially started (a lower portion of FIG. 6), the closing operation of the roof is started at the point A before the storage compartment cover reaches the fully open position (the point B) (an upper portion of FIG. 6). The point B represents a point in time at which the storage compartment cover is fully opened and at which the distance between the roof performing the closing operation and the storage compartment cover is minimum to the extent that the roof does not interfere with the storage compartment cover. As described above, the minimum distance means the distance by which the adjacent portions of the roof and the storage compartment cover facing each other are distant from each other at the point in time when the storage compartment cover is fully opened, and which is shorter than at any other point in time. Thus, the roof and the storage compartment cover do not interfere with each other even during the other operations, because the roof and the storage compartment cover do not interfere with each other when the storage compartment cover is fully opened.

As can be seen from the foregoing description, in this embodiment, the closing operation of the roof is started during the full opening operation of the storage compartment cover as shown in FIG. 6. This can reduce the time taken to close the entire system by the amount of time during which the storage compartment cover and the roof operate in parallel.

<Variation of Full Opening Operation of Roof>

Figure 7:
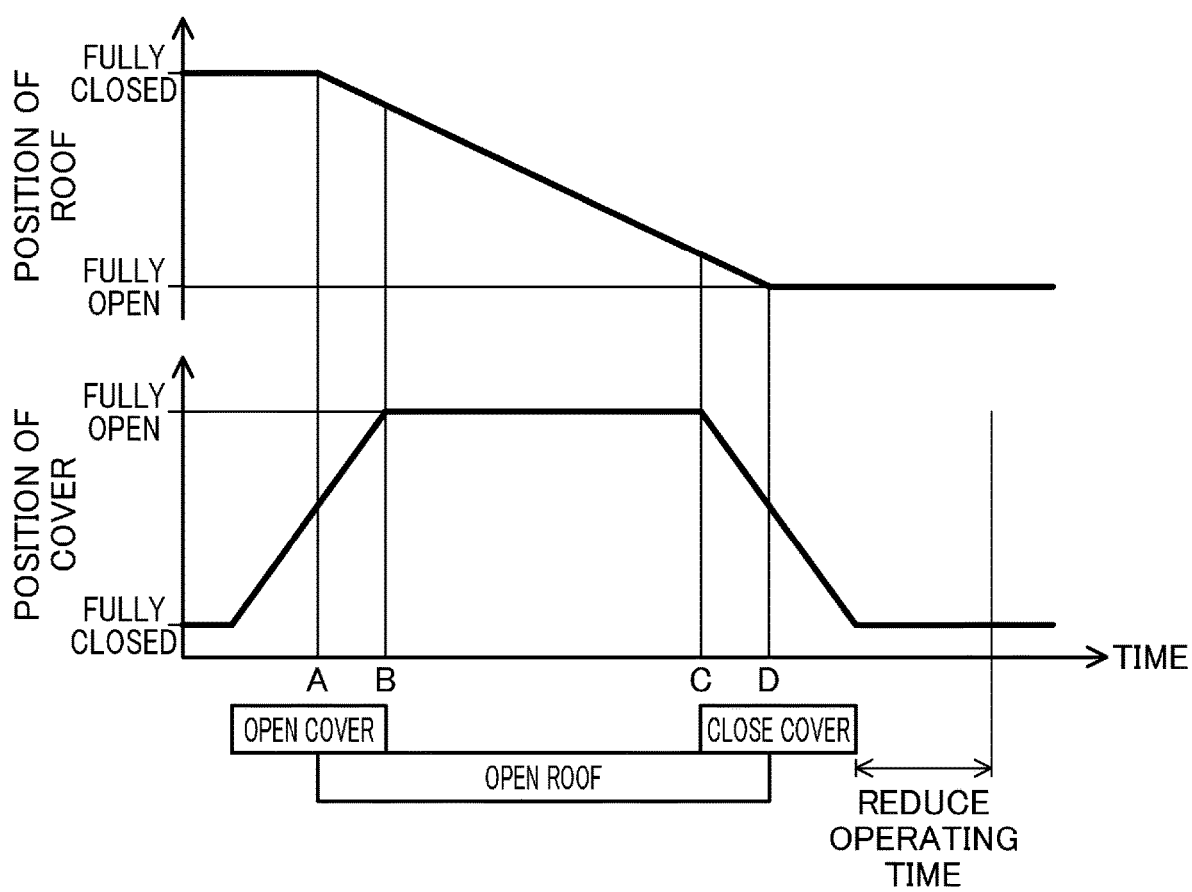
FIG. 7 shows a variation of the full opening operation of the openable/closable roof according to the embodiment of the present invention, and is a timing chart showing how a portion of the full opening operation of the roof after actuation of the roof and a portion of the opening operation of the storage compartment cover are performed in parallel and how a portion of the full opening operation of the roof immediately before full opening of the roof and a portion of a closing operation of the storage compartment cover are performed in parallel.

FIG. 7 shows a variation of FIG. 5, and shows how control is performed so that a portion of the opening operation of the storage compartment cover and a portion of the opening operation of the roof are performed in parallel, and a portion of the closing operation of the storage compartment cover and a portion of the opening operation of the roof are performed in parallel.

In FIG. 7, the closing operation of the storage compartment cover (cover closing) is started at a point C before the roof reaches the fully open position (a point D). The point C represents a point in time at which the distance between the roof performing the opening operation and the fully open storage compartment cover is minimum to the extent that the roof does not interfere with the storage compartment cover. The minimum distance means the distance by which the (adjacent) portions of the roof and the fully open storage compartment cover facing each other are distant from each other while the storage compartment cover is in the fully open state, and which is minimum. Thus, the roof and the storage compartment cover do not interfere with each other even during the other operations, because the roof and the storage compartment cover do not interfere with each other when the storage compartment cover is fully opened.

As can be seen from the foregoing description, in this variation, the closing operation of the storage compartment cover is started during the full opening operation of the roof as shown in FIG. 7. This can reduce the time taken to open the entire system by the amount of time during which the roof and the storage compartment cover operate in parallel.

At least either operating the roof in parallel with the opening operation of the storage compartment cover as shown in FIG. 5 or operating the roof in parallel with the closing operation of the storage compartment cover as shown in FIG. 7 can provide an advantage of the present invention.

<Variation of Full Closing Operation of Roof>

Figure 8:
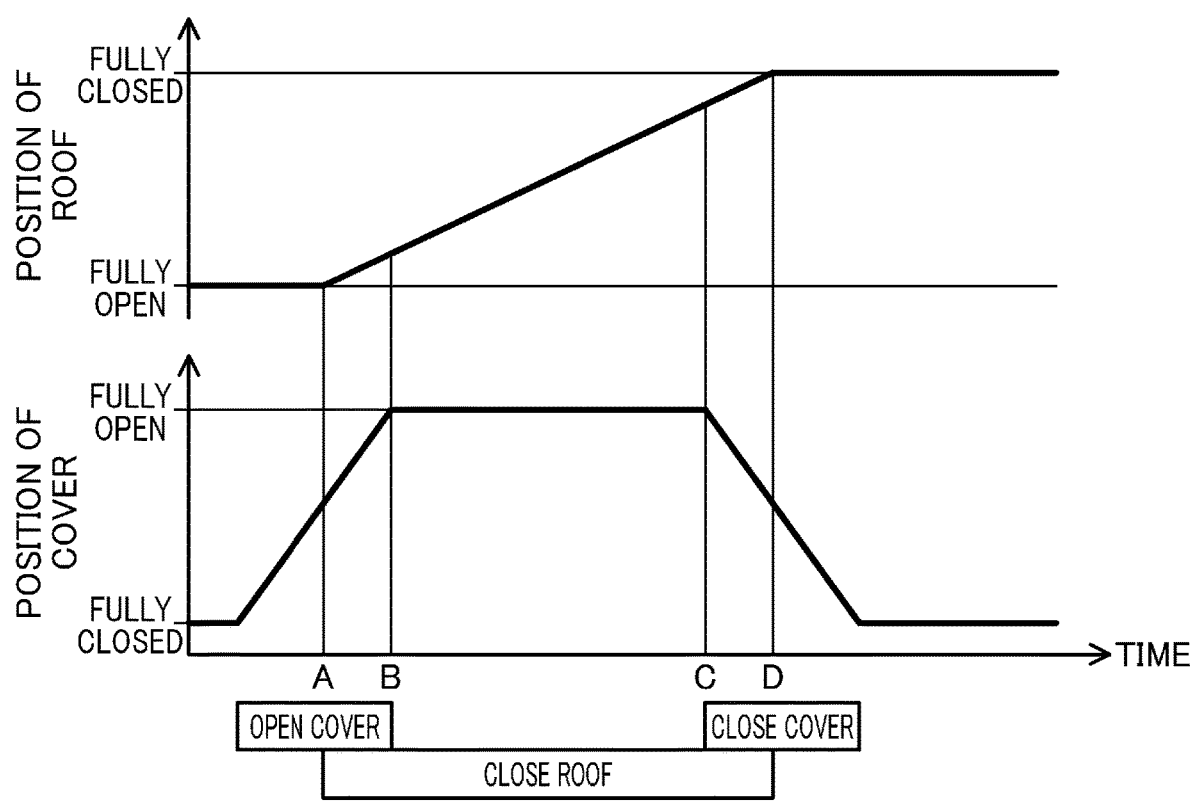
FIG. 8 shows a variation of the full closing operation of the openable/closable roof according to the embodiment of the present invention, and is a timing chart showing how a portion of the full closing operation of the roof after actuation of the roof and a portion of the opening operation of the storage compartment cover are performed in parallel and how a portion of the full closing operation of the roof immediately before full closing of the roof and a portion of the closing operation of the storage compartment cover are performed in parallel.

FIG. 8 shows a variation of FIG. 6, and shows how control is performed so that a portion of the opening operation of the storage compartment cover and a portion of the closing operation of the roof are performed in parallel, and a portion of the closing operation of the storage compartment cover and a portion of the closing operation of the roof are performed in parallel.

In FIG. 8, the closing operation of the storage compartment cover (cover closing) is started at the point C before the roof reaches the fully open position (the point D). The point C represents a point in time at which the distance between the roof performing the closing operation and the fully open storage compartment cover is minimum to the extent that the roof does not interfere with the storage compartment cover. The minimum distance means the distance by which the (adjacent) portions of the roof and the fully open storage compartment cover facing each other are distant from each other while the storage compartment cover is in the fully open state, and which is minimum. Thus, the roof and the storage compartment cover do not interfere with each other even during the other operations, because the roof and the storage compartment cover do not interfere with each other when the storage compartment cover is fully opened.

As can be seen from the foregoing description, in this variation, the closing operation of the storage compartment cover is started during the full closing operation of the roof as shown in FIG. 8. This can reduce the time taken to close the entire system by the amount of time during which the roof and the storage compartment cover operate in parallel.

At least either operating the roof in parallel with the opening operation of the storage compartment cover as shown in FIG. 6 or operating the roof in parallel with the closing operation of the storage compartment cover as shown in FIG. 8 can provide an advantage of the present invention.

In this embodiment, for example, the opening operation of the roof is started at the point A earlier than the point B as shown in FIG. 5 so that at the point B when the storage compartment cover fully opens, the distance between the roof and the storage compartment cover is minimum to the extent that the the roof does not interfere with the storage compartment cover. The point A can be determined if the moving speeds of the roof and the storage compartment cover are previously measured. The moving speeds of the roof and the storage compartment cover can be calculated based on the number of revolutions of the electric motor as described below. The same applies to the variations.

EXAMPLES

Examples of a method for reducing the time it takes for an openable/closable roof to open and close will now be described with reference to the drawings.

First Example

In a first example, how a position at which an operating roof and an operating storage compartment cover are close to each other is determined and defined will be described with reference to FIG. 9.

In this example, a vehicle 1 includes a controller 100 controlling the roof and the storage compartment cover.

Figure 9:
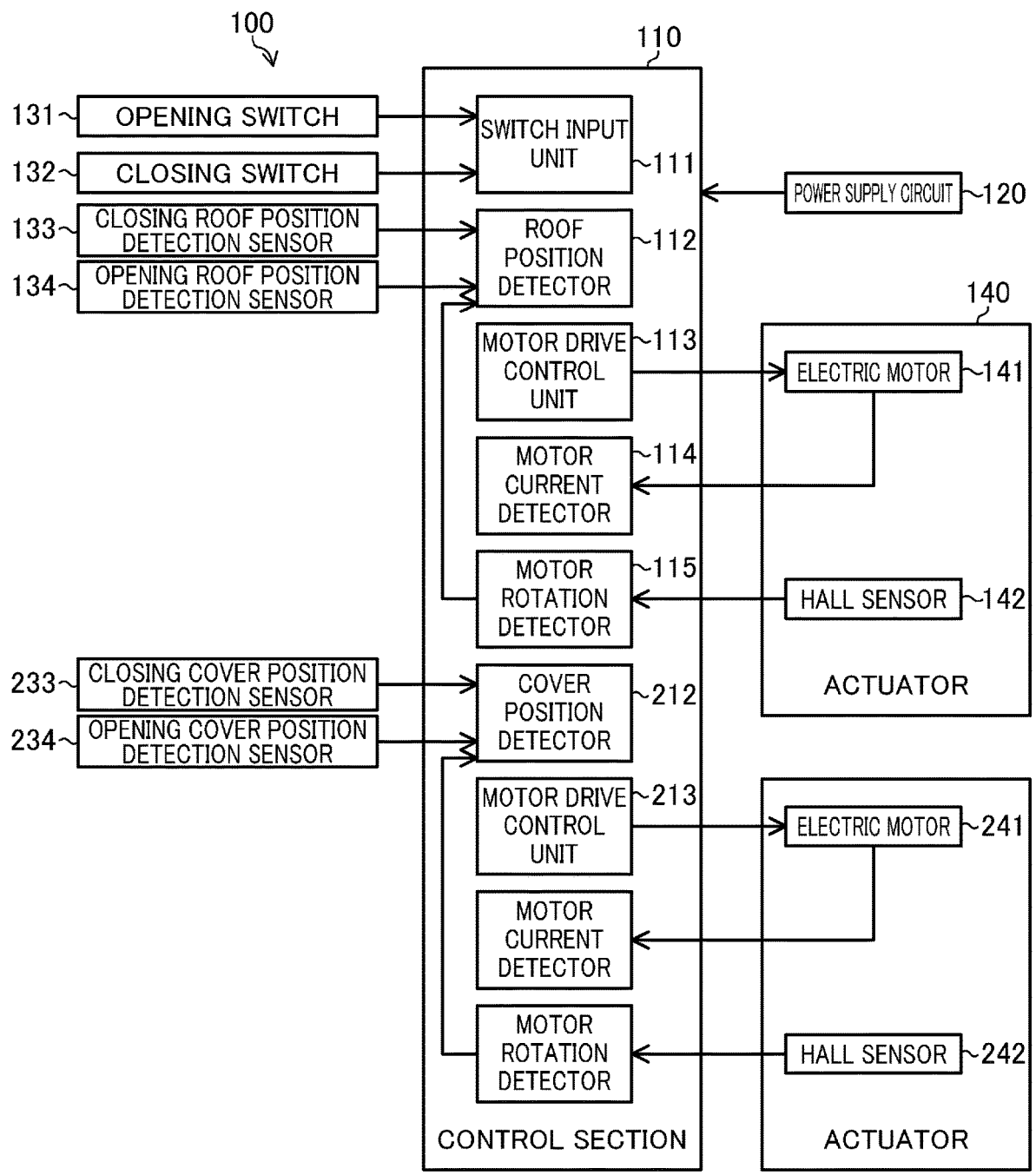
FIG. 9 is a block diagram showing a roof controller for implementing a method for reducing the time taken to open and close the openable/closable roof and the storage compartment cover according to a first example of the present invention.

As shown in FIG. 9, the controller 100 includes a control section 110. The control section 110 includes a central processing unit (CPU), a random access memory (RAM), a read only memory (ROM), and an input/output (I/O) port (which are not shown), and receives power from a power supply circuit 120 to operate. The power supply circuit 120 includes a vehicle-mounted battery and an ignition switch (which are not shown).

The control section 110 includes a switch input unit 111 connected to an opening switch 131 and a closing switch 132. The switch input unit 111 detects whether or not the opening switch 131 and the closing switch 132 are on. The control section 110 further includes a roof position detector 112 connected to at least two closing roof position detection sensors 133 and at least two opening roof position detection sensors 134. The roof position detector 112 detects whether or not each of the roof position detection sensors 133 and 134 is on.

The control section 110 further includes a motor rotation detector 115 connected to a Hall sensor 142. The motor rotation detector 115 is capable of detecting whether or not an electric motor 141 rotates, based on a pulse signal output from the Hall sensor 142. Thus, the position in which the roof operates can be detected. The pulse-to-pulse interval is constant if the rotational speed of the electric motor 141 is unchanged. Thus, the motor rotation detector 115 measuring the pulse-to-pulse interval allows the rotational speed of the electric motor 141 to be grasped.

The control section 110 further includes a motor current detector 114 and a motor drive control unit 113 that are connected to the electric motor 141. The motor current detector 114 detects a current value of the electric motor 141. The motor drive control unit 113 is connected to the switch input unit 111, the roof position detector 112, the motor current detector 114, and the motor rotation detector 115, and controls current flowing through the electric motor 141 to select whether the electric motor 141 rotates or stops and to change the direction of rotation of the electric motor 141. Changing the direction of rotation of the electric motor 141 triggers a change in the direction in which the roof moves.

The motor drive control unit 113 is configured to count the pulse number detected by the motor rotation detector 115 and grasp the position of the roof based on the counted pulse number. Specifically, the number of revolutions at which the electric motor 141 rotates while the roof is switching from the fully closed position to the fully open position is determined by design. This allows the pulse number obtained while the roof is switching from the fully closed position to the fully open position to be previously calculated based on the number of revolutions of the electric motor 141. For example, if the pulse number is zero while the roof is in the fully closed state, the position of the roof can be grasped based on the pulse number increasing as the roof moves in the direction in which the roof opens.

Meanwhile, the vehicle 1 is provided with the closing roof position detection sensors 133 and the opening roof position detection sensors 134, which detect the position in which the roof operates. Each of the closing roof position detection sensors 133 is a contact sensor, such as a limit switch, configured to detect whether or not a predetermined member is in contact with the sensor and to be in an on state only while the member is in contact with the sensor. The closing roof position detection sensor 133 is disposed to be in contact with the roof when the roof is in a predetermined position during the closing operation. Thus, when the roof is in a predetermined position while switching from the fully open position to the closed position, the closing roof position detection sensor 133 turns on, whereas when the roof passes through the predetermined position, the closing roof position detection sensor 133 turns off.

Each of the opening roof position detection sensors 134 has a configuration similar to that of the closing roof position detection sensor 133. The opening roof position detection sensor 134 is disposed to be in contact with the roof when the roof is in a predetermined position during the opening operation. Thus, when the roof is in a predetermined position while switching from the fully closed position to the open position, the opening roof position detection sensor 134 turns on, whereas when the roof passes through the predetermined position, the opening roof position detection sensor 134 turns off.

The opening switch 131 and the closing switch 132 are provided in the passenger compartment. The opening switch 131 is configured to fully open the roof. The closing switch 132 is configured to fully close the roof. The opening switch 131 and the closing switch 132 are operated by a passenger.

<Full Opening Operation of Roof>

Figure 10:
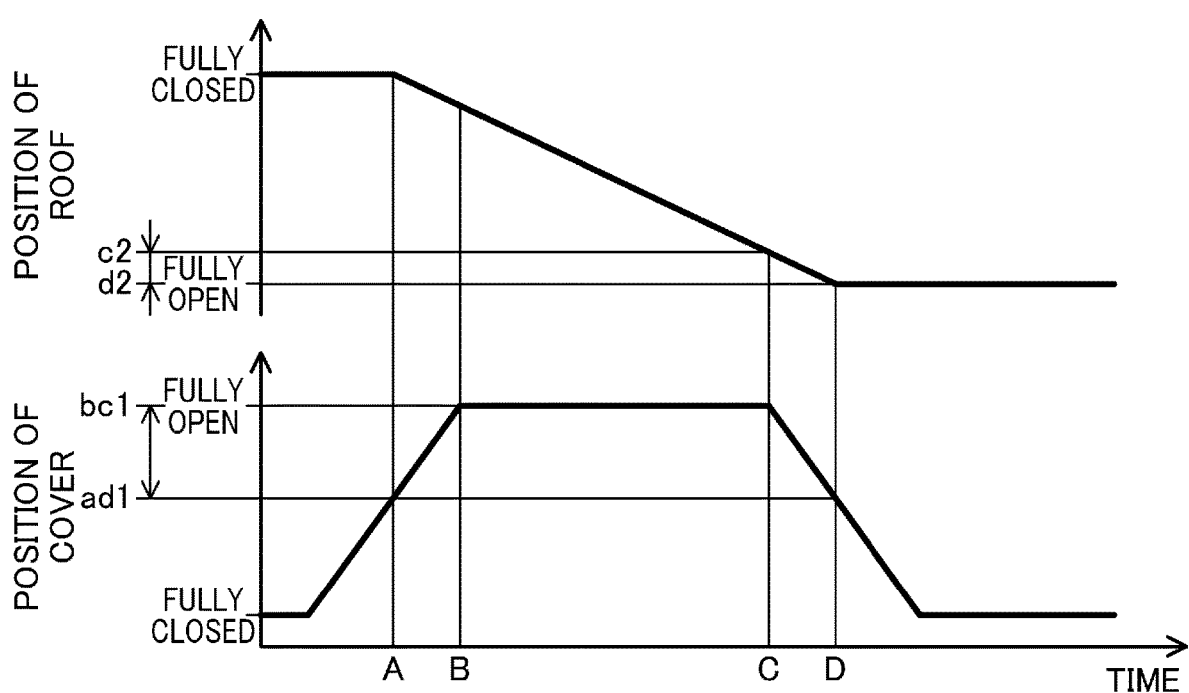
FIG. 10 is a timing chart showing a full opening operation of an openable/closable roof according to the first example of the present invention.

How control is performed while the roof shifts from the fully closed position to the retracted position will be described in detail with reference to FIG. 10. FIG. 10 is a graph equivalent to FIG. 7 described above, and further shows the relation between the elapsed time and the position of the storage compartment cover that does not interfere with the roof (a lower portion of FIG. 10), and the relation between the elapsed time and the position of the roof that does not interfere with the storage compartment cover (an upper portion of FIG. 10).

Specifically, for example, during the period of time from the point A on the horizontal axis in the lower portion of FIG. 10 to the point D thereon, if the storage compartment cover is in a position from a position ad1 to a position bc1 on the vertical axis representing the position of the storage compartment cover, the storage compartment cover does not interfere with the roof. The point A is earlier than the point B at which the operating storage compartment cover enters into the fully open state. The point D is later than the point C at which the storage compartment cover starts the closing operation. The reason for this non-interference is that, as described in the foregoing embodiment, the point B at which the storage compartment cover performing the opening operation enters into the fully opened state is the earliest point at which the distance between adjacent portions of the roof and the storage compartment cover facing each other at the point in time when the storage compartment cover is fully opened is shorter than at any other point (i.e., shortest), and the portions of the roof and the storage compartment cover facing each other moves away from each other (i.e., the distance between them increases).

An exemplary method for determining the points A, B, C, and D will now be described using the controller 100 shown in FIG. 9.

As shown in the lower portion of FIG. 10, for example, if the storage compartment cover starts the opening operation, the Hall sensor 242 or an opening cover position detection sensor 234 checks that the position in which the storage compartment cover operates has reached the position ad1 in which the storage compartment cover does not interfere with the roof. For the Hall sensor 242, the pulse number from the Hall sensor 242 can previously determine the position ad1 of the storage compartment cover. For the opening cover position detection sensor 234, an on signal is output from the opening cover position detection sensor 234 to a cover position detector 212 at the point in time when the storage compartment cover reaches the position ad1. Note that only either the Hall sensor 242 or the cover position detection sensors 233 and 234 are used to determine the position in which the storage compartment cover operates.

On the other hand, if the controller 100 checks that the position in which the storage compartment cover operates has reached the position ad1, the motor drive control unit 113 instructs the electric motor 141 to be driven. Thus, the roof starts the opening operation.

Next, in the upper portion of FIG. 10, the Hall sensor 142 or the opening roof position detection sensor 134 checks that the position in which the roof operates has reached the position c2 in which the roof does not interfere with the storage compartment cover before reaching the position d2 in which the roof finishes the opening operation. For the Hall sensor 142, the pulse number from the Hall sensor 142 can previously determine the position c2 of the roof. For the opening roof position detection sensor 134, an on signal is output from the opening roof position detection sensor 134 to the roof position detector 112 at the point in time when the roof reaches the position c2. Note that only either the Hall sensor 142 or the roof position detection sensors 133 and 134 are used to determine the position in which the roof operates.

On the other hand, if it is checked that the position in which the roof operates has reached the position c2, the motor drive control unit 213 for the storage compartment cover instructs the associated electric motor 241 to be driven. Thus, the storage compartment cover starts the closing operation.

<Full Closing Operation of Roof>

Figure 11:
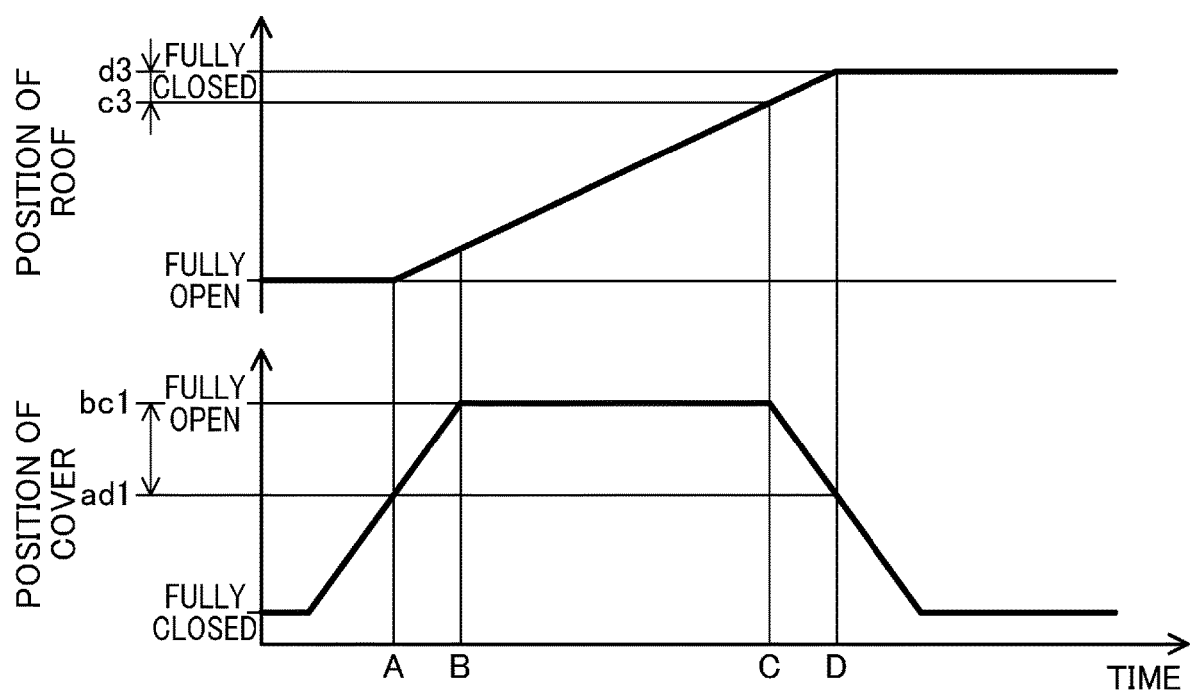
FIG. 11 is a timing chart showing a full closing operation of the openable/closable roof according to the first example of the present invention.

How control is performed while the roof shifts from the retracted position to the fully closed position will be described in detail with reference to FIG. 11. FIG. 11 is a graph equivalent to FIG. 8 described above, and further shows the relation between the elapsed time and the position of the storage compartment cover that does not interfere with the roof (a lower portion of FIG. 11), and the relation between the elapsed time and the position of the roof that does not interfere with the storage compartment cover (an upper portion of FIG. 11).

Specifically, for example, during the period of time from the point A on the horizontal axis in the lower portion of FIG. 11 to the point D thereon, if the storage compartment cover is in a position from a position ad1 to a position bc1 on the vertical axis representing the position of the storage compartment cover, the storage compartment cover does not interfere with the roof. The point A is earlier than the point B at which the operating storage compartment cover enters into the fully open state. The point D is later than the point C at which the storage compartment cover starts the closing operation. The reason for this non-interference is that, as described above, the point B at which the storage compartment cover performing the opening operation is fully opened is the earliest point at which the distance between the adjacent portions of the roof and the storage compartment cover facing each other at the point in time when the storage compartment cover is fully opened is shorter than at any other point (i.e., shortest), and the portions of the roof and the storage compartment cover facing each other moves away from each other (i.e., the distance between them increases).

An exemplary method for determining the points A, B, C, and D will now be described using the controller 100 shown in FIG. 9.

As shown in the lower portion of FIG. 11, for example, if the storage compartment cover starts the opening operation, the Hall sensor 242 or the opening cover position detection sensor 234 checks that the position in which the storage compartment cover operates has reached the position ad1 in which the storage compartment cover does not interfere with the roof, just like the case shown in FIG. 10. For the Hall sensor 242, the pulse number from the Hall sensor 242 can previously determine the position ad1 of the storage compartment cover. For the opening cover position detection sensor 234, an on signal is output from the opening cover position detection sensor 234 to the cover position detector 212 at the point in time when the storage compartment cover reaches the position ad1.

On the other hand, if the controller 100 checks that the position in which the storage compartment cover operates has reached the position ad1, the motor drive control unit 113 instructs the electric motor 141 to be driven. Thus, the roof starts the opening operation.

Next, in the upper portion of FIG. 11, the Hall sensor 142 or the opening roof position detection sensor 134 checks that the position in which the roof operates has reached the position c3 in which the roof does not interfere with the storage compartment cover before reaching the position d3 in which the roof finishes the closing operation. For the Hall sensor 142, the pulse number from the Hall sensor 142 can previously determine the position c3 of the roof. For the opening roof position detection sensor 134, an on signal is output from the opening roof position detection sensor 134 to the roof position detector 112 at the point in time when the roof reaches the position c3.

On the other hand, if it is checked that the position in which the roof operates has reached the position c3, the motor drive control unit 213 for the storage compartment cover instructs the associated electric motor 241 to be driven. Thus, the storage compartment cover starts the closing operation.

Second Example

In a second example, a method for superimposing the movement paths of the operating roof and the operating storage compartment cover one over the other to define a non-interference region where the roof and the storage compartment cover do not interfere with each other will be described with reference to FIGS. 12 to 17.

The movement paths of the operating roof and the operating storage compartment cover can be easily obtained based on three-dimensional design data (e.g., through animation of the data).

<Full Opening Operation of Roof (Step of Opening Storage Compartment Cover)>

Figure 12:
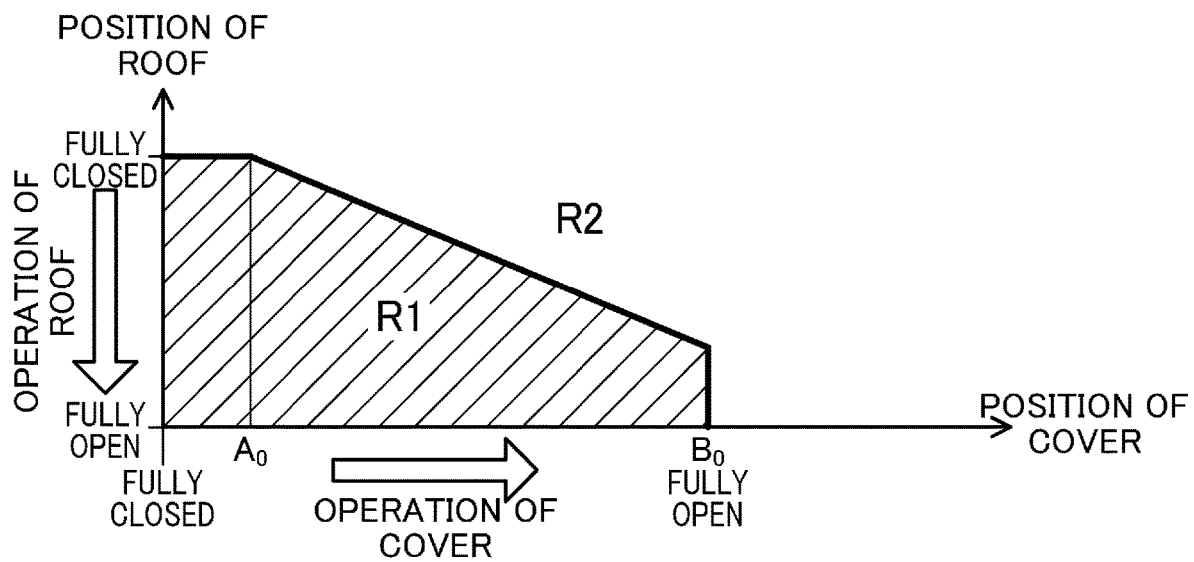
FIG. 12 is a timing chart showing an interference region where if an openable/closable roof moves in a direction in which the roof opens during an opening operation of a storage compartment cover according to a second example of the present invention, the openable/closable roof that is performing a full opening operation interferes with a storage compartment cover that is performing the opening operation, and a non-interference region where in the same situation, the roof and the storage compartment cover do not interfere with each other.

FIG. 12 schematically shows an interference region and a non-interference region of the storage compartment cover performing the opening operation with the roof performing the opening operation in a situation where the roof according to the second example performs the opening operation.

In FIG. 12, the horizontal axis represents the position of the storage compartment cover, and the vertical axis represents the position of the roof. FIG. 12 shows an interference region R1 where the roof and the storage compartment cover interfere with each other and a non-interference region R2 where the roof and the storage compartment cover do not interfere with each other when the opening operation of the roof is partially performed in parallel with the opening operation of the storage compartment cover. As can be seen from FIG. 12, in the interference region R1 which is located inside the line graph showing the position of the roof (shown by the vertical axis) and the position of the storage compartment cover (shown by the horizontal axis) and which ranges from the fully closed position of the roof to the fully open position of the storage compartment cover, the closer the storage compartment cover is to the fully closed position (the origin point of the graph), the more easily the storage compartment cover interferes with the roof, and the closer the storage compartment cover is to the fully open position, the more difficult it is for the storage compartment cover to interfere with the roof. Here, it is found that after the point $A_0$ at which the width of the interference region R1 along the horizontal axis starts increasing, the opening operation of the roof can be started. Note that a situation where the width of the interference region R1 along the horizontal axis increases is equivalent to a situation where the storage compartment cover approaches its fully open position. The point $A_0$ is the earliest point in time when the roof and the storage compartment cover reaches the non-interference region R2 after the point in time when the storage compartment cover starts the opening operation. The point $B_0$ is a point in time when the storage compartment cover fully opens.

The point $A_0$ according to the second example can be determined using the controller 100 by a method similar to that in the first example.

<(Full Closing Operation of Roof (Step of Opening Storage Compartment Cover)>

Figure 13:
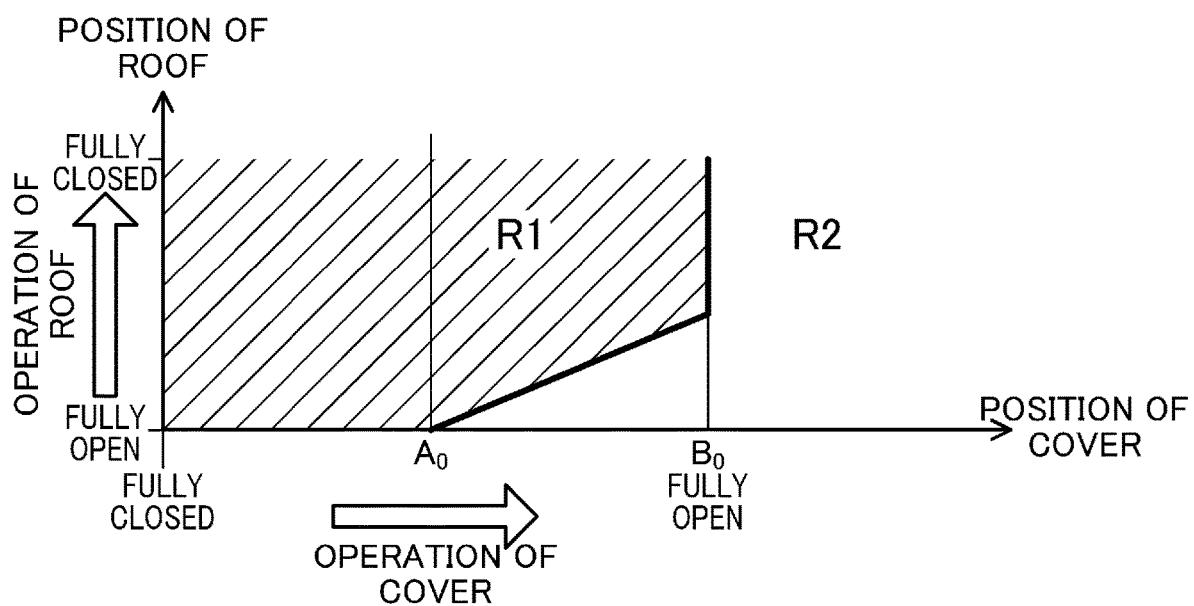
FIG. 13 is a timing chart showing an interference region where if the openable/closable roof moves in a direction in which the roof closes during the opening operation of the storage compartment cover according to the second example of the present invention, the openable/closable roof that is performing a full closing operation interferes with the storage compartment cover that is performing the opening operation, and a non-interference region where in the same situation, the roof and the storage compartment cover do not interfere with each other.

FIG. 13 schematically shows an interference region and a non-interference region of the storage compartment cover performing the opening operation with the roof performing the closing operation in a situation where the roof according to the second example performs the closing operation.

Also in FIG. 13, the horizontal axis represents the position of the storage compartment cover, and the vertical axis represents the position of the roof. FIG. 13 shows an interference region R1 where the roof and the storage compartment cover interfere with each other and a non-interference region R2 where the roof and the storage compartment cover do not interfere with each other when the closing operation of the roof is partially performed in parallel with the opening operation of the storage compartment cover. As can be seen from FIG. 13, the closer the storage compartment cover is to the fully closed position (the origin point of the graph), the more easily the storage compartment cover interferes with the roof, and the closer the storage compartment cover is to the fully open position, the more difficult it is for the storage compartment cover to interfere with the roof. Here, it is found that after the point $A_0$ at which the width of the non-interference region R2 along the horizontal axis starts increasing, the closing operation of the roof can be started. Note that a situation where the width of the non-interference region R2 along the horizontal axis increases is equivalent to a situation where the storage compartment cover approaches its fully open position. The point $A_0$ is a point in time to which the amount of time from the point in time when the storage compartment cover in the non-interference region R2 starts the opening operation is smallest. The point $B_0$ is a point in time when the storage compartment cover fully opens.

The point $A_0$ according to the second example can be determined using the controller 100 by a method similar to that in the first example.

<Full Opening Operation of Roof (Step of Closing Storage Compartment Cover)>

Figure 14:
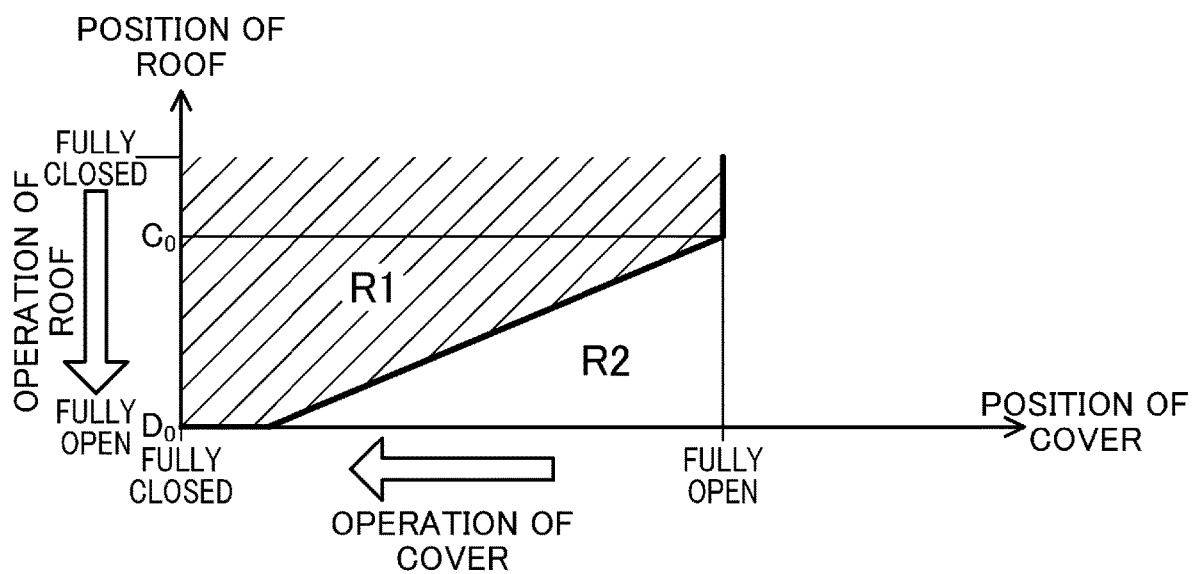
FIG. 14 is a timing chart showing an interference region where if the storage compartment cover performs a closing operation during the opening operation of the openable/closable roof according to the second example of the present invention, the openable/closable roof that is performing the opening operation during its full opening operation interferes with the storage compartment cover, and a non-interference region where in the same situation, the roof and the storage compartment cover do not interfere with each other.

FIG. 14 schematically shows an interference region and a non-interference region of the storage compartment cover performing the closing operation with the roof performing the opening operation in a situation where the roof according to the second example performs the closing operation.

Also in FIG. 14, the horizontal axis represents the position of the storage compartment cover, and the vertical axis represents the position of the roof. FIG. 14 shows an interference region R1 where the roof and the storage compartment cover interfere with each other and a non-interference region R2 where the roof and the storage compartment cover do not interfere with each other when the closing operation of the storage compartment cover is partially performed in parallel with the opening operation of the roof. As can be seen from FIG. 14, the closer the roof is to the fully closed position, the more easily the roof interferes with the storage compartment cover, and the closer the roof is to the fully open position (the origin point of the graph), the more difficult it is for the roof to interfere with the storage compartment cover. Here, it is found that after the point $C_0$ at which the height of the interference region R1 along the vertical axis starts decreasing, the closing operation of the storage compartment cover can be started. Note that a situation where the height of the interference region R1 along the vertical axis decreases is equivalent to a situation where the roof approaches its fully open position. The point $C_0$ is a point in time to which the amount of time from the point in time when the roof in the non-interference region R2 starts performing the opening operation is smallest. The point $D_0$ is a point in time when the roof fully opens.

The point $C_0$ according to the second example can be determined using the controller 100 by a method similar to that in the first example.

<Full Closing Operation of Roof (Step of Closing Storage Compartment Cover)>

Figure 15:
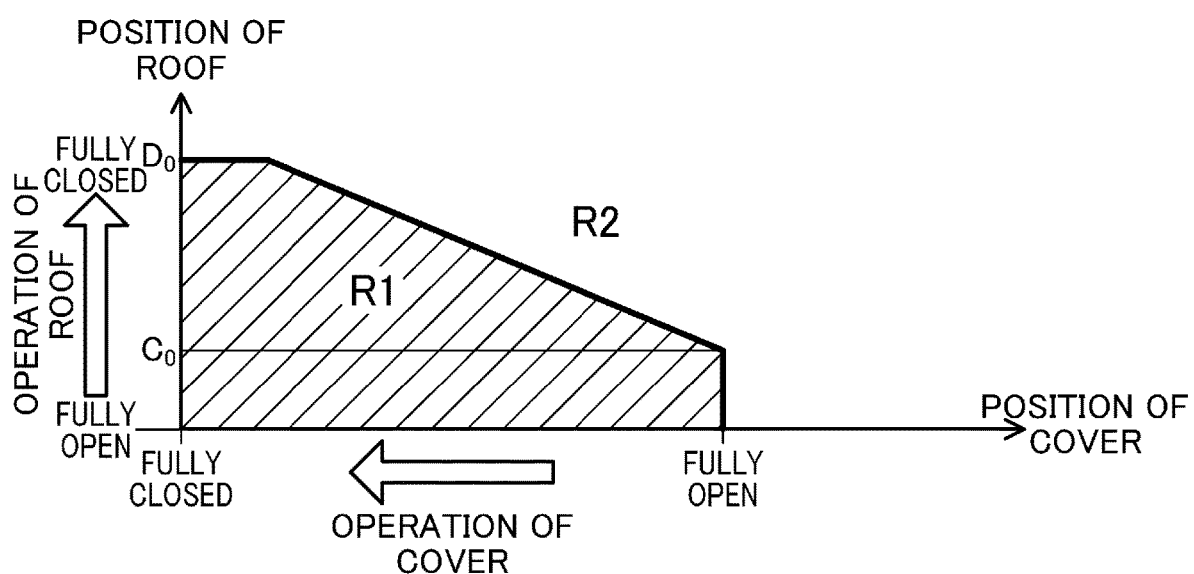
FIG. 15 is a timing chart showing an interference region where if the storage compartment cover performs a closing operation during the closing operation of the openable/closable roof according to the second example of the present invention, the openable/closable roof that is performing the closing operation during its full closing operation interferes with the storage compartment cover, and a non-interference region where in the same situation, the roof and the storage compartment cover do not interfere with each other.

FIG. 15 schematically shows an interference region and a non-interference region of the storage compartment cover performing the closing operation with the roof performing the closing operation in a situation where the roof according to the second example performs the closing operation.

Also in FIG. 15, the horizontal axis represents the position of the storage compartment cover, and the vertical axis represents the position of the roof. FIG. 15 shows an interference region R1 where the roof and the storage compartment cover interfere with each other and a non-interference region R2 where the roof and the storage compartment cover do not interfere with each other when the closing operation of the storage compartment cover is partially performed in parallel with the closing operation of the roof. As can be seen from FIG. 15, in the interference region R1 which is located inside the line graph showing the position of the roof (shown by the horizontal axis) and the position of the storage compartment cover (shown by the vertical axis) and which ranges from the fully closed position of the roof to the fully open position of the storage compartment cover, the closer the storage compartment cover is to the fully closed position (the origin point of the graph), the more easily the storage compartment cover interferes with the roof, and the closer the storage compartment cover is to the fully open position, the more difficult it is for the storage compartment cover to interfere with the roof. Here, it is found that after the point $C_0$ at which the height of the interference region R1 along the vertical axis starts increasing, the closing operation of the storage compartment cover can be started. Note that a situation where the height of the interference region R1 along the vertical axis increases is equivalent to a situation where the roof approaches its fully closed position. The point $C_0$ is a point in time to which the amount of time from the point in time when the roof in the non-interference region R2 starts the closing operation is smallest. The point $D_0$ is a point in time when the roof fully closes.

The point $C_0$ according to the second example can be determined using the controller 100 by a method similar to that in the first example.

Figure 16:
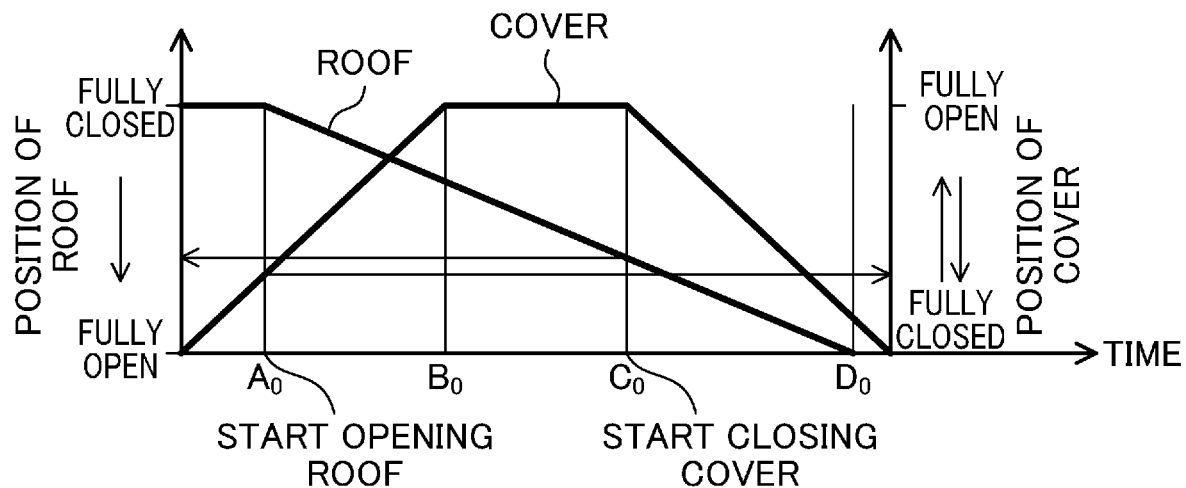
FIG. 16 is a timing chart showing the full opening operation of the openable/closable roof according to the second example of the present invention.
Figure 17:
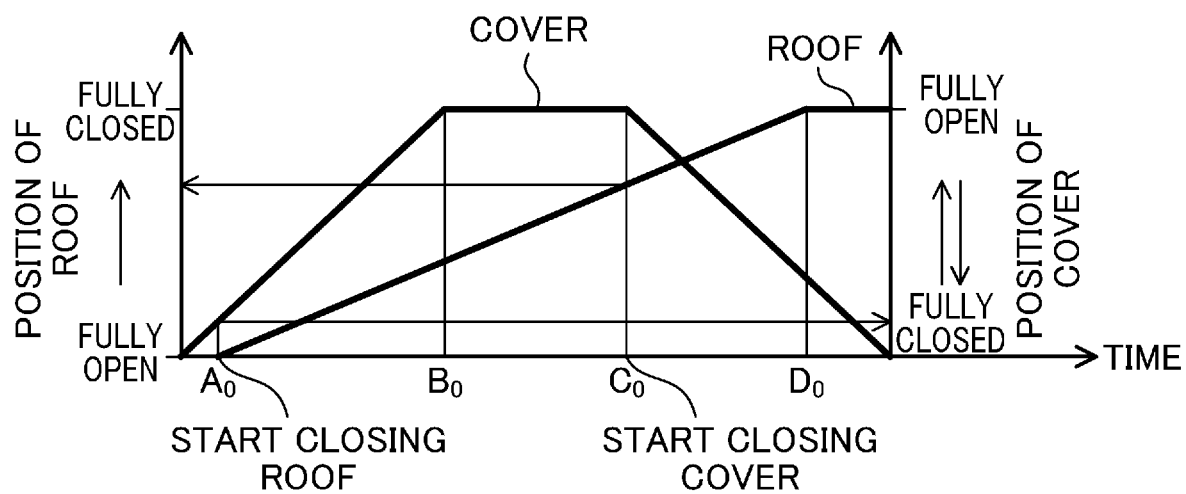
FIG. 17 is a timing chart showing the full closing operation of the openable/closable roof according to the second example of the present invention.

FIG. 16 is a timing chart showing a full opening operation of the roof involving the opening and closing operations of the storage compartment cover, based on the relation between FIG. 12 and FIG. 14. FIG. 17 is a timing chart showing a full closing operation of the roof involving the opening and closing operations of the storage compartment cover, based on the relation between FIG. 13 and FIG. 15.

As can be seen, in the second example in which the non-interference region R2 between the storage compartment cover and the roof is defined and used, the opening operation of the roof is performed in parallel with the opening operation of the storage compartment cover from the point $A_0$ to the point $B_0$ as shown in FIG. 16. The opening operation of the roof is performed also in parallel with the closing operation of the storage compartment cover from the point $C_0$ to the point $D_0$. This reduces the time it takes for the roof to perform a full opening operation.

Likewise, the closing operation of the roof is performed in parallel with the opening operation of the storage compartment cover from the point $A_0$ to the point $B_0$ as shown in FIG. 17. The closing operation of the roof is performed also in parallel with the closing operation of the storage compartment cover from the point $C_0$ to the point $D_0$. This reduces the time it takes for the roof to perform a full closing operation.

Third Example

In a third example, a method for setting the moving speeds of the operating roof and the operating storage compartment cover to be lower than their respective normal moving speeds immediately after the members start operating and immediately before the members finish operating will be described with reference to FIGS. 18 and 19. This setting allows passengers to feel more secure (safer), in particular, immediately before the roof and the storage compartment cover are fully closed, than if the members are operated at a constant speed during the entire period of time during which the members operate.

<Full Opening Operation of Roof>

Figure 18:
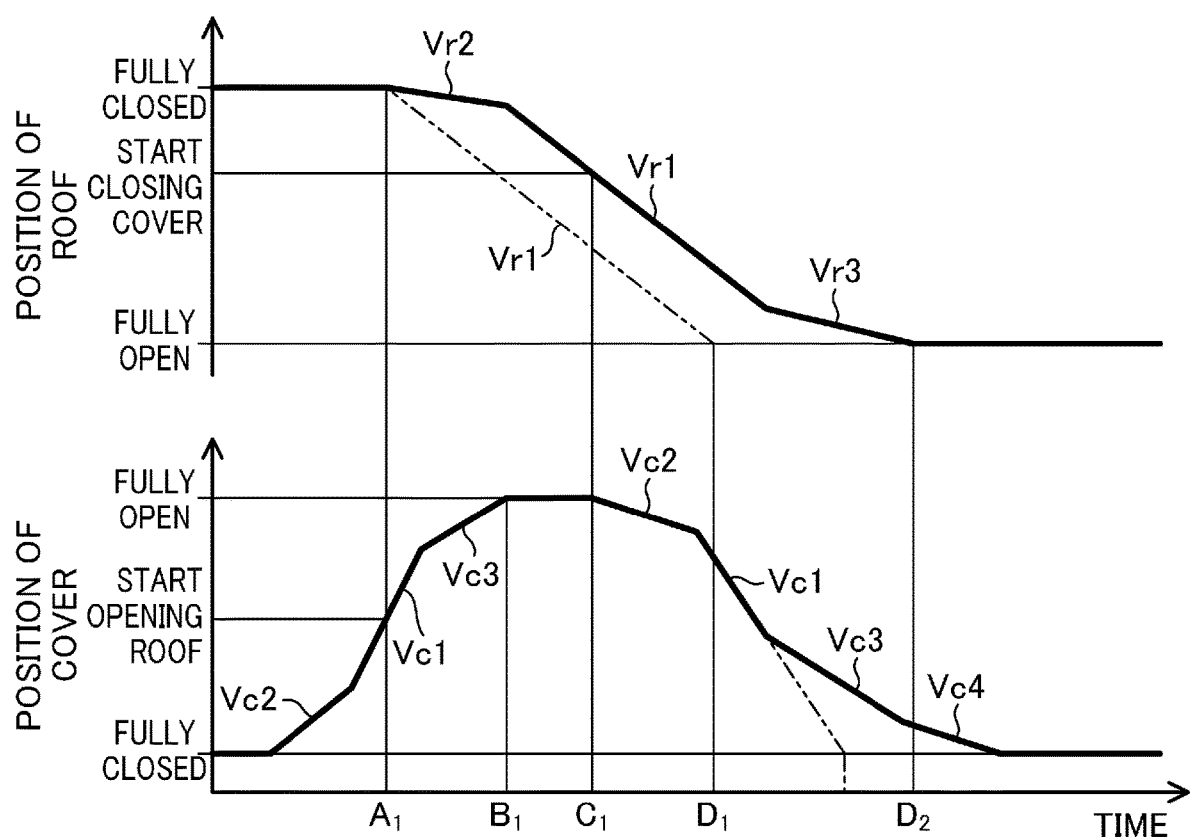
FIG. 18 is a timing chart showing a full opening operation of an openable/closable roof according to a third example of the present invention.

For example, the moving speed $V_{r2}$ of the roof that has just started an opening operation is set to be lower than the normal moving speed $V_{r1}$ thereof, and the moving speed $V_{r3}$ of the roof that will finish the opening operation soon is also set to be lower than the normal moving speed $V_{r1}$, as shown in the upper portion of FIG. 18.

Accordingly, the moving speed $V_{c2}$ of the storage compartment cover that has just started an opening operation is set to be lower than the normal moving speed $V_{c1}$ thereof, and the moving speed $V_{c3}$ of the storage compartment cover that will finish the opening operation soon is also set to be lower than the normal moving speed $V_{c1}$, as shown in the lower portion of FIG. 18. In addition, also in a closing operation of the storage compartment cover, the moving speed $V_{c2}$ of the storage compartment cover that has just started the closing operation and the moving speed $V_{c3}$ of the storage compartment cover that will finish the closing operation soon are set to be lower than the normal moving speed $V_{c1}$.

<Full Closing Operation of Roof>

Figure 19:
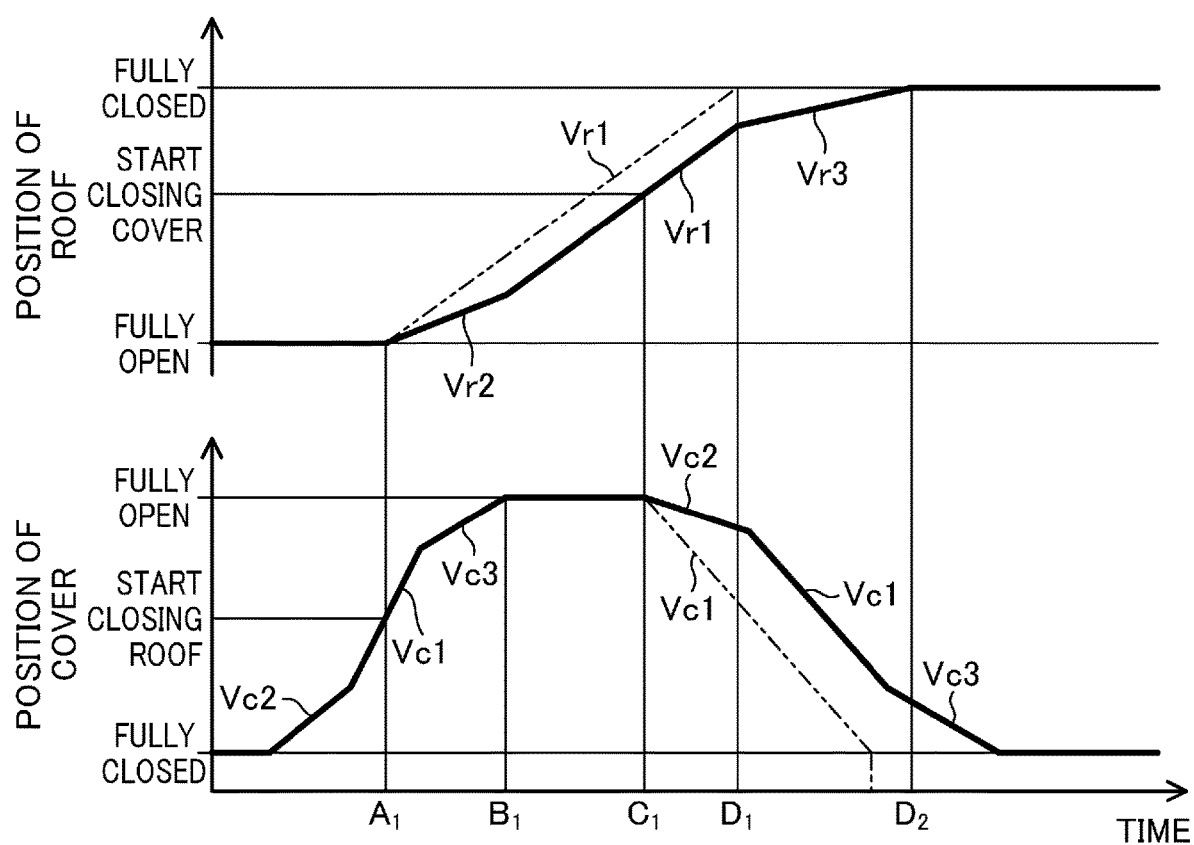
FIG. 19 is a timing chart showing a full closing operation of the openable/closable roof according to the third example of the present invention.
Figure 20:
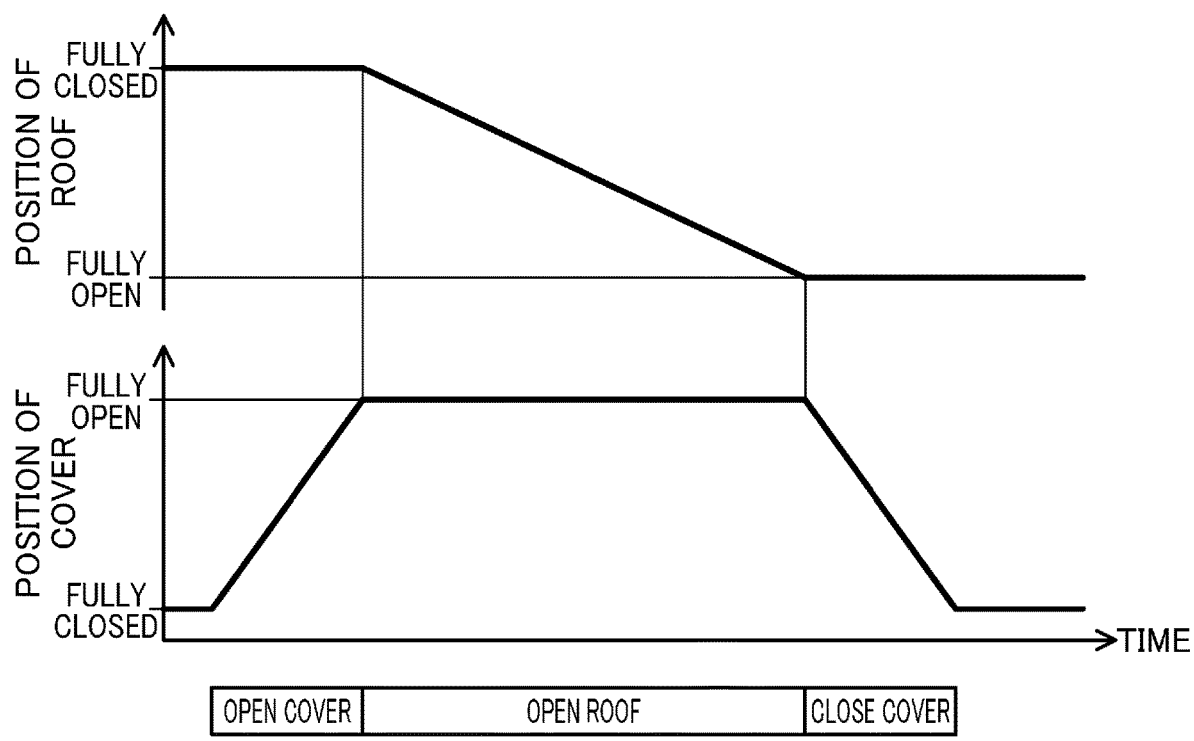
FIG. 20 is a timing chart showing a full opening operation of an openable/closable roof according to a known example.

Next, for example, the moving speed $V_{r2}$ of the roof that has just started a closing operation is set to be lower than the normal moving speed $V_{r1}$ thereof, and the moving speed $V_{r3}$ of the roof that will finish the closing operation soon is also set to be lower than the normal moving speed $V_{r1}$, as shown in the upper portion of FIG. 19.

Accordingly, the moving speed $V_{c2}$ of the storage compartment cover that has just started an opening operation is set to be lower than the normal moving speed $V_{c1}$ thereof, and the moving speed $V_{c3}$ of the storage compartment cover that will finish the opening operation soon is also set to be lower than the normal moving speed $V_{c1}$, as shown in the lower portion of FIG. 19. In addition, also in a closing operation of the storage compartment cover, the moving speed $V_{c2}$ of the storage compartment cover that has just started the closing operation and the moving speed $V_{c3}$ of the storage compartment cover that will finish the closing operation soon are set to be lower than the normal moving speed $V_{c1}$.

As can be seen, in this example, to allow passengers of the vehicle to feel secure, the moving speeds of the roof and the storage compartment cover are set to be lower than the steady-state speeds $V_{r1}$ and $V_{c1}$, respectively, immediately after the roof and the storage compartment cover start operating and immediately before the roof and the storage compartment cover finish operating.

According to the present invention, the opening or closing operation of the roof is performed in parallel with the operation of the storage compartment cover. Thus, if, to prevent interference between the roof and the storage compartment cover, the moving speed of the roof is reduced immediately after the roof starts the opening or closing operation and immediately before the roof finishes the opening or closing operation, the moving speed of the storage compartment cover also needs to be reduced immediately after the storage compartment cover starts the opening or closing operation and immediately before the storage compartment cover finishes the opening or closing operation.

These moving speeds can be each controlled using an associated one of the Hall sensors 142 and 242 described in the first example.

In this example, the moving speeds of the roof and the storage compartment cover are reduced immediately after the roof and the storage compartment cover start the opening and closing operations and immediately before the roof and the storage compartment cover finish the opening and closing operations. However, this is merely an example of the present invention. The moving speeds of the roof and the storage compartment cover may be reduced both immediately after the roof and the storage compartment cover starts the opening and closing operations and immediately before the roof and the storage compartment cover finish the opening and closing operations or only immediately before the roof and the storage compartment cover finish the opening and closing operations.

Additionally, the third example, in which the moving speeds of the roof and the storage compartment cover are reduced immediately after the roof and the storage compartment cover start the opening and closing operations and immediately before the roof and the storage compartment cover finish the opening and closing operations, is applicable to the embodiment and the first and second examples of the present invention.

INDUSTRIAL APPLICABILITY

The present invention is applicable to, for example, a vehicle including an openable/closable roof that is desired to open and close in a shorter time.

DESCRIPTION OF REFERENCE CHARACTERS

1 Vehicle
11 Trunk Lid (Storage Compartment Cover)
20 Retractable Roof (Openable/Closable Roof)
100 Controller
110 Control Section
R1 Interference Region (Between Roof and Storage Compartment Cover)
R2 Non-interference Region (Between Roof and Storage Compartment Cover)

The invention claimed is:

1. A method for reducing a time taken to open and close an electric openable/closable roof of a vehicle, the vehicle including the electric openable/closable roof, a storage compartment in which the openable/closable roof is retracted, and an electric storage compartment cover covering the storage compartment, the method comprising:
when the openable/closable roof shifts from a closed state to an open state,
a first step of opening the closed storage compartment cover;
a second step of opening the closed openable/closable roof; and
a third step of closing the open storage compartment cover; and
when the openable/closable roof shifts from the open state to the closed state,
a fourth step of opening the closed storage compartment cover;
a fifth step of closing the open openable/closable roof; and
a sixth step of closing the open storage compartment cover, wherein:
the second step starts before the first step finishes, so that a distance between adjacent portions of the storage compartment cover and the openable/closable roof facing each other is shortest while the storage compartment cover is in a fully open state in the first step, and
the fifth step starts before the fourth step finishes, so that a distance between the adjacent portions of the storage compartment cover and the openable/closable roof facing each other is shortest while the storage compartment cover is in the fully open state in the fourth step.

2. The method of claim 1, wherein
the third step starts before the second step finishes, so that a distance between the portions of the storage compartment cover and the openable/closable roof facing each other is shortest while the storage compartment cover is in a fully open state in the third step, and
the sixth step starts before the fifth step finishes, so that a distance between the portions of the storage compartment cover and the openable/closable roof facing each other is shortest while the storage compartment cover is in a fully open state in the sixth step.

3. The method of claim 1, wherein
adjusting a moving speed of the storage compartment cover and a moving speed of the openable/closable roof allows a distance between the storage compartment cover and the openable/closable roof at a point in time when the storage compartment cover is fully opened in the first and fourth steps to be shorter than at any other point in time.

4. The method of claim 2, wherein
adjusting a moving speed of the storage compartment cover and a moving speed of the openable/closable roof allows a distance between the storage compartment cover and the openable/closable roof to be shortest while the storage compartment cover is in a fully open state in the third and sixth steps.

5. The method of claim 1, wherein
the second and fifth steps each start when the storage compartment cover reaches a region where the openable/closable roof and the storage compartment cover do not interfere with each other.

6. The method of claim 2, wherein
the third and sixth steps each start when the openable/closable roof reaches a region where the openable/closable roof and the storage compartment cover do not interfere with each other.

7. The method of claim 1, wherein
the second and fifth steps each start when the storage compartment cover reaches a non-interference region where movement paths of the openable/closable roof and the storage compartment cover do not interfere with each other.

8. The method of claim 2, wherein
the third and sixth steps each start when the openable/closable roof reaches a non-interference region where movement paths of the openable/closable roof and the storage compartment cover do not interfere with each other.

9. The method of claim 1, wherein
in each of the first, second, third, fourth, fifth, and sixth steps, moving speeds of the openable/closable roof and the storage compartment cover are reduced both immediately after the openable/closable roof and the storage compartment cover start operating and immediately before the openable/closable roof and the storage compartment cover finish operating or only immediately before the openable/closable roof and the storage compartment cover finish operating.

\* \* \* \* \*